US006571318B1

(12) United States Patent
Sander et al.

(10) Patent No.: US 6,571,318 B1
(45) Date of Patent: May 27, 2003

(54) STRIDE BASED PREFETCHER WITH CONFIDENCE COUNTER AND DYNAMIC PREFETCH-AHEAD MECHANISM

(75) Inventors: Benjamin T. Sander, Austin, TX (US); William A. Hughes, Burlingame, CA (US); Sridhar P. Subramanian, Sunnyvale, CA (US); Teik-Chung Tan, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 306 days.

(21) Appl. No.: 09/798,469

(22) Filed: Mar. 2, 2001

(51) Int. Cl.[7] .............................................. G06F 12/00
(52) U.S. Cl. ...................... 711/137; 711/204; 711/213; 711/220
(58) Field of Search ................................ 711/137, 204, 711/213, 217, 220–221

(56) References Cited

U.S. PATENT DOCUMENTS

| | | | | |
|---|---|---|---|---|
| 5,537,573 A | | 7/1996 | Ware et al. .................. 711/137 |
| 5,649,144 A | * | 7/1997 | Gostin et al. ............... 711/220 |
| 5,740,399 A | | 4/1998 | Mayfield et al. ............ 711/137 |
| 5,774,685 A | | 6/1998 | Dubey ......................... 712/205 |
| 5,809,529 A | | 9/1998 | Mayfield .................... 711/137 |
| 5,941,981 A | | 8/1999 | Tran ........................... 712/207 |
| 6,055,622 A | * | 4/2000 | Spillinger ................... 712/207 |
| 6,078,996 A | * | 6/2000 | Hagersten ................... 711/137 |
| 6,119,203 A | | 9/2000 | Snyder et al. .............. 711/137 |
| 6,138,213 A | | 10/2000 | McMinn ...................... 711/137 |
| 6,219,760 B1 | | 4/2001 | McMinn ...................... 711/137 |
| 6,490,658 B1 | * | 12/2002 | Ahmed et al. .............. 711/140 |

OTHER PUBLICATIONS

Ki, et al. "Adaptive Data Prefetching Using Cache Information," Dept. of Computer Sciences, ICS 1997, Vienna Austria, pp. 204–212.

* cited by examiner

Primary Examiner—Do Hyun Yoo
Assistant Examiner—Nasser Moazzami
(74) Attorney, Agent, or Firm—Lawrence J. Merkel; Meyertons, Hood, Kivlin, Kowert & Goetzel, P.C.

(57) ABSTRACT

A processor is described which includes a stride detect table. The stride detect table includes one or more entries, each entry used to track a potential stride pattern. Additionally, each entry includes a confidence counter. The confidence counter may be incremented each time another address in the pattern is detected, and thus may be indicative of the strength of the pattern (e.g., the likelihood of the pattern repeating). At a first threshold of the confidence counter, prefetching of the next address in the pattern (the most recent address plus the stride) may be initiated. At a second, greater threshold, a more aggressive prefetching may be initiated (e.g. the most recent address plus twice the stride). In some implementations, the prefetch mechanism including the stride detect table may replace a prefetch buffer and prefetch logic in the memory controller.

31 Claims, 12 Drawing Sheets

| Time | Miss Address | A[35:6] | CC | Req P | Req P+2 | P+2D one | Prefetch Address |
|---|---|---|---|---|---|---|---|
| | A  140 | A | 0 | 0 | 0 | 0 | DNA |
| | A+1 | A+1 | 1 | 0 | 0 | 0 | DNA |
| | A+2  142 | A+2 | 2 | 0 | 0 | 0 | DNA |
| | A+3 | A+3 | 3 | 1 | 0 | 0 | -- |
| | -- | A+3 | 3 | 0 | 0 | 0 | 144  A+4 |
| | A+4  146 | A+4 | 4 | 1 | 0 | 0 | -- |
| | A+5 | A+5 | 5 | 1 | 0 | 0 | -- |
| | -- | A+5 | 5 | 0 | 0 | 0 | 148  A+6 |
| | A+6  150 | A+6 | 6 | 1 | 1 | 0 | -- |
| | -- | A+6 | 6 | 0 | 1 | 0 | 152  A+7 |
| | A+7  154 | A+7 | 7 | 1 | 1 | 0 | -- |
| | -- | A+7 | 7 | 0 | 1 | 0 | 156  A+8 |
| | -- | A+7 | 7 | 0 | 0 | 1 | 158  A+9 |
| | A+8  160 | A+8 | 8 | 0 | 1 | 1 | -- |
| | -- | A+8 | 8 | 0 | 0 | 1 | 162  A+10 |
| | A+9  164 | A+9 | 9 | 0 | 1 | 1 | -- |
| | A+10  166 | A+10 | 10 | 1 | 1 | 1 | -- |
| | -- | A+10 | 10 | 0 | 1 | 1 | A+11 |
| | -- | A+10 | 10 | 0 | 0 | 1 | A+12 |

Fig. 7

STRIDE BASED PREFETCHER WITH CONFIDENCE COUNTER AND DYNAMIC PREFETCH-AHEAD MECHANISM

BACKGROUND OF THE INVENTION

1. Field of the Invention

This invention is related to the field of processors and, more particularly, to prefetch mechanisms in processors.

2. Description of the Related Art

Memory latency is frequently a large factor in determining the performance (e.g. instructions executed per second) of a processor in a given computer system. Over time, the operating frequencies of processors have increased dramatically, while the latency for access to dynamic random access memory (DRAM) in the typical computer system has not decreased as dramatically. Additionally, transmitting memory requests from the processor to the memory controller coupled to the memory system also requires time, which increases the memory latency. Accordingly, the number of processor clocks required to access the DRAM memory has increased, from latencies (as measured in processor clocks) of a few processor clocks, through tens of processor clocks, to over a hundred processor clocks in modern computer systems.

Processors have implemented caches to combat the effects of memory latency on processor performance. Caches are relatively small, low latency memories incorporated into the processor or coupled nearby. The caches store recently used instructions and/or data under the assumption that the recently used information may be accessed by the processor again. The caches may thus reduce the effective memory latency experienced by a processor by providing frequently accessed information more rapidly than if the information had to be retrieved from the memory system in response to each access.

If processor memory requests (e.g. instruction fetches and load and store memory operations) are cache hits (the requested information is stored in the processor's cache), then the memory requests are not transmitted to the memory system. Accordingly, memory bandwidth may be freed for other uses. However, the first time a particular memory location is accessed, a cache miss occurs (since the requested information is stored in the cache after it has been accessed for the first time) and the information is transferred from the memory system to the processor (and may be stored in the cache). Additionally, since the caches are finite in size, information stored therein may be replaced by more recently accessed information. If the replaced information is accessed again, a cache miss will occur. The cache misses then experience the memory latency before the requested information arrives.

One way that the memory bandwidth may be effectively utilized is to predict the information that is to be accessed soon and to prefetch that information from the memory system into the cache. If the prediction is correct, the information may be a cache hit at the time of the actual request and thus the effective memory latency for actual requests may be decreased. Alternatively, the prefetch may be in progress at the time of the actual request, and thus the latency for the actual request may still be less than the memory latency even though a cache hit does not occur for the actual request. On the other hand, if the prediction is incorrect, the prefetched information may replace useful information in the cache, causing more cache misses to be experienced than if prefetching were not employed and thus increasing the effective memory latency.

SUMMARY OF THE INVENTION

A processor is described which includes a stride detect table. The stride detect table includes one or more entries, each entry used to track a potential stride pattern. Additionally, each entry includes a confidence counter. The confidence counter may be incremented each time another address in the pattern is detected, and thus may be indicative of the strength of the pattern (e.g., the likelihood of the pattern repeating). At a first threshold of the confidence counter, prefetching of the next address in the pattern (the most recent address plus the stride) may be initiated. At a second, greater threshold, a more aggressive prefetching may be initiated (e.g. the most recent address plus twice the stride). Since the aggressiveness of the prefetch is related to the number of times the pattern has repeated, aggressive prefetching may be performed for patterns which may be more likely to repeat. Thus, prefetching of data which is not subsequently used may be low.

In one implementation, prefetched cache lines may be stored in the L2 cache. Cache pollution may have a more limited affect in such implementations. Additionally, an implementation may track the patterns of addresses which miss the L1 cache, thereby potentially reducing the number of patterns to be tracked and thus the size of the stride detect table. Some implementations may detect collisions between prefetch addresses and subsequent miss addresses to cause the more aggressive prefetching, in addition to the second threshold of the confidence counter. In some embodiments, the implementation of prefetch in the processor and buffering of the prefetch data in a cache (such as the L2 cache) may allow for elimination of prefetching and a prefetch buffer from the memory controller in the system including the processor.

Implementing prefetch as described above may lead to more accurate prefetching in some implementations. For example, since the actual stream of misses from the cache in one processor is observed by the prefetch mechanism described herein, the patterns detected may be more likely to correspond to miss patterns in code being executed. When prefetch is implemented in the memory controller, observability is generally limited to the miss stream on the interface to the memory controller, which may be include misses from two or more processors (in multiprocessor systems). Thus patterns may be detected among misses from different processors. Such patterns may be less likely to repeat than patterns detected in a miss stream from one processor (or one cache).

Broadly speaking, a processor is contemplated, comprising a table and a control circuit coupled thereto. The table includes at least a first entry configured to store at least a portion of a first address and a corresponding first count. The control circuit is configured to select a second address equal to a sum of the first address and a first value as a prefetch address responsive to the first count being greater than or equal to a first threshold. Furthermore, the control circuit is configured to select a third address equal to a sum of the first address and a second value as the prefetch address responsive to the first count being greater than or equal to a second threshold. The second value is greater than the first value, and the second threshold is greater than the first threshold.

Additionally, a method is contemplated. At least a portion of a first address and a corresponding first count are stored. A second address equal to a sum of the first address and a first value is selected as a prefetch address responsive to the first count being greater than or equal to a first threshold. A third address equal to a sum of the first address and a second value is selected as the prefetch address responsive to the first count being greater than or equal to a second threshold. The second value is greater than the first value, and the second threshold is greater than the first threshold.

BRIEF DESCRIPTION OF THE DRAWINGS

The following detailed description makes reference to the accompanying drawings, which are now briefly described.

FIG. 7 is an example flow of addresses and prefetch addresses according to one embodiment of the stride detect table and the prefetch control circuit.

Figure 1:
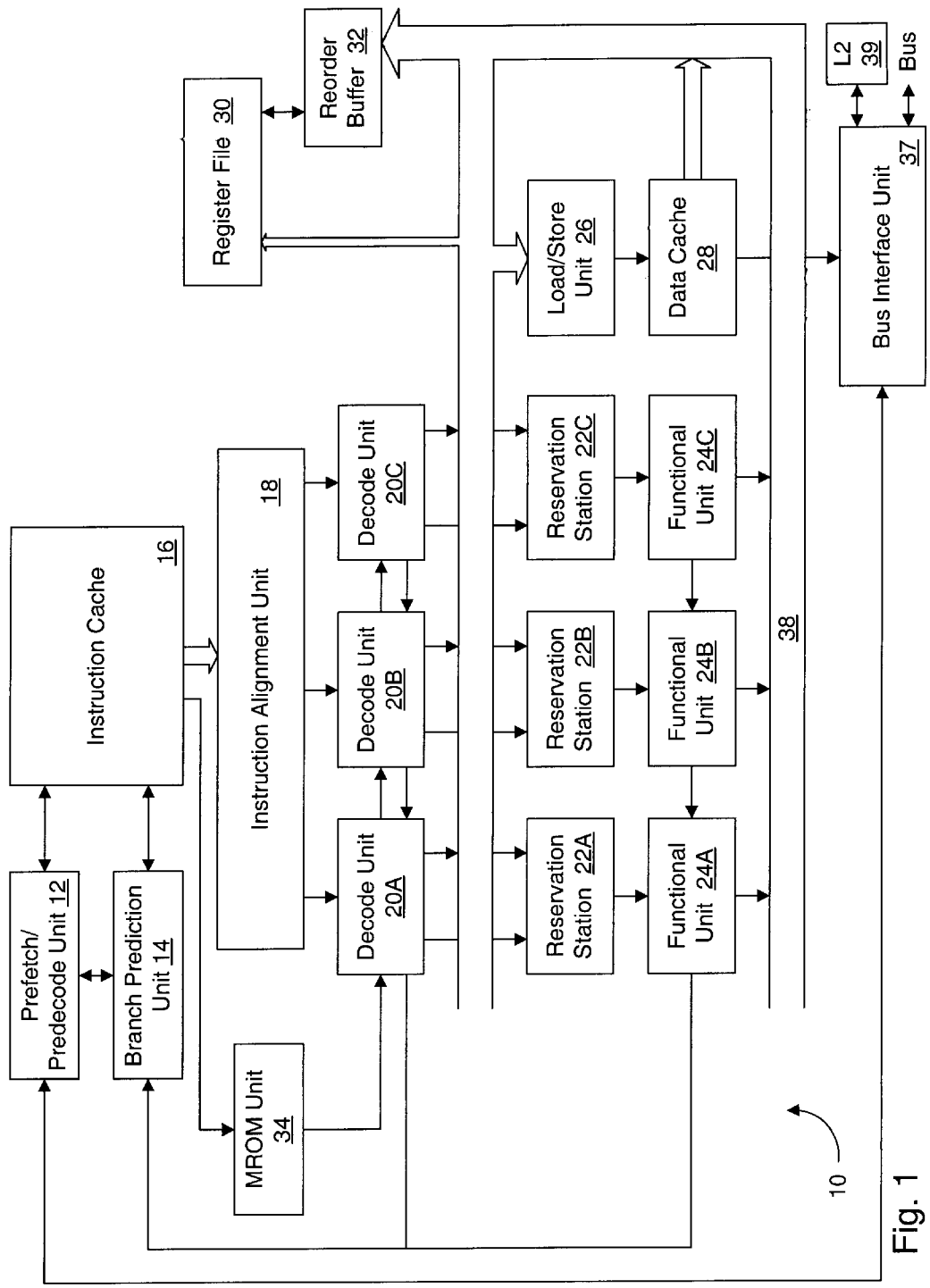
FIG. 1 is a block diagram of one embodiment of a processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Processor Overview

Turning now to FIG. 1, a block diagram of one embodiment of a processor 10 is shown. Other embodiments are possible and contemplated. As shown in FIG. 1, processor 10 includes a prefetch/predecode unit 12, a branch prediction unit 14, an instruction cache 16, an instruction alignment unit 18, a plurality of decode units 20A–20C, a plurality of reservation stations 22A–22C, a plurality of functional units 24A–24C, a load/store unit 26, a data cache 28, a register file 30, a reorder buffer 32, an MROM unit 34, a bus interface unit 37, and an L2 cache 39. Elements referred to herein with a particular reference number followed by a letter will be collectively referred to by the reference number alone. For example, decode units 20A–20C will be collectively referred to as decode units 20.

Prefetch/predecode unit 12 is coupled to receive instructions from bus interface unit 37, and is further coupled to instruction cache 16 and branch prediction unit 14. Similarly, branch prediction unit 14 is coupled to instruction cache 16. Still further, branch prediction unit 14 is coupled to decode units 20 and functional units 24. Instruction cache 16 is further coupled to MROM unit 34 and instruction alignment unit 18. Instruction alignment unit 18 is in turn coupled to decode units 20. Each decode unit 20A–20C is coupled to load/store unit 26 and to respective reservation stations 22A–22C. Reservation stations 22A–22C are further coupled to respective functional units 24A–24C. Additionally, decode units 20 and reservation stations 22 are coupled to register file 30 and reorder buffer 32. Functional units 24 are coupled to load/store unit 26, register file 30, and reorder buffer 32 as well. Data cache 28 is coupled to load/store unit 26 and to bus interface unit 37. Bus interface unit 37 is further coupled to L2 cache 39 and a bus. Finally, MROM unit 34 is coupled to decode units 20.

Instruction cache 16 is a high speed cache memory provided to store instructions. Instructions are fetched from instruction cache 16 and dispatched to decode units 20. In one embodiment, instruction cache 16 is configured to store up to 64 kilobytes of instructions in a 2 way set associative structure having 64 byte lines (a byte comprises 8 binary bits). Alternatively, any other desired configuration and size may be employed. For example, it is noted that instruction cache 16 may be implemented as a fully associative, set associative, or direct mapped configuration.

Instructions are stored into instruction cache 16 by prefetch/predecode unit 12. Instructions may be prefetched prior to the request thereof from instruction cache 16 in accordance with a prefetch scheme. A variety of prefetch schemes may be employed by prefetch/predecode unit 12. As prefetch/predecode unit 12 transfers instructions to instruction cache 16, prefetch/predecode unit 12 generates three predecode bits for each byte of the instructions: a start bit, an end bit, and a functional bit. The predecode bits form tags indicative of the boundaries of each instruction. The predecode tags may also convey additional information such as whether a given instruction can be decoded directly by decode units 20 or whether the instruction is executed by invoking a microcode procedure controlled by MROM unit 34, as will be described in greater detail below. Still further, prefetch/predecode unit 12 may be configured to detect branch instructions and to store branch prediction information corresponding to the branch instructions into branch prediction unit 14. Other embodiments may employ any suitable predecode scheme.

One encoding of the predecode tags for an embodiment of processor 10 employing a variable byte length instruction set will next be described. A variable byte length instruction set is an instruction set in which different instructions may occupy differing numbers of bytes. An exemplary variable byte length instruction set employed by one embodiment of processor 10 is the x86 instruction set (also referred to as APX or IA-32).

In the exemplary encoding, if a given byte is the first byte of an instruction, the start bit for that byte is set. If the byte is the last byte of an instruction, the end bit for that byte is set. Instructions which may be directly decoded by decode units 20 are referred to as "fast path" instructions. The remaining x86 instructions are referred to as MROM instructions, according to one embodiment. For fast path instructions, the functional bit is set for each prefix byte included in the instruction, and cleared for other bytes. Alternatively, for MROM instructions, the functional bit is cleared for each prefix byte and set for other bytes. The type of instruction may be determined by examining the functional bit corresponding to the end byte. If that functional bit is clear, the instruction is a fast path instruction. Conversely, if that functional bit is set, the instruction is an MROM instruction. The opcode of an instruction may thereby be located within an instruction which may be directly decoded by decode units 20 as the byte associated with the first clear functional bit in the instruction. For example, a fast path instruction including two prefix bytes, a Mod R/M byte, and an immediate byte would have start, end, and functional bits as follows:

| | |
|---|---|
| Start bits | 10000 |
| End bits | 00001 |
| Functional bits | 11000 |

MROM instructions are instructions which are determined to be too complex for decode by decode units 20. MROM instructions are executed by invoking MROM unit 34. More specifically, when an MROM instruction is encountered, MROM unit 34 parses and issues the instruction into a subset of defined fast path instructions to effectuate the desired operation. MROM unit 34 dispatches the subset of fast path instructions to decode units 20.

Processor 10 employs branch prediction in order to speculatively fetch instructions subsequent to conditional branch instructions. Branch prediction unit 14 is included to perform branch prediction operations. In one embodiment, branch prediction unit 14 employs a branch target buffer which caches up to two branch target addresses and corresponding taken/not taken predictions per 16 byte portion of a cache line in instruction cache 16. The branch target buffer may, for example, comprise 2048 entries or any other suitable number of entries. Prefetch/predecode unit 12 determines initial branch targets when a particular line is predecoded. Subsequent updates to the branch targets corresponding to a cache line may occur due to the execution of instructions within the cache line. Instruction cache 16 provides an indication of the instruction address being fetched, so that branch prediction unit 14 may determine which branch target addresses to select for forming a branch prediction. Decode units 20 and functional units 24 provide update information to branch prediction unit 14. Decode units 20 detect branch instructions which were not predicted by branch prediction unit 14. Functional units 24 execute the branch instructions and determine if the predicted branch direction is incorrect. The branch direction may be "taken", in which subsequent instructions are fetched from the target address of the branch instruction. Conversely, the branch direction may be "not taken", in which subsequent instructions are fetched from memory locations consecutive to the branch instruction. When a mispredicted branch instruction is detected, instructions subsequent to the mispredicted branch are discarded from the various units of processor 10. In an alternative configuration, branch prediction unit 14 may be coupled to reorder buffer 32 instead of decode units 20 and functional units 24, and may receive branch misprediction information from reorder buffer 32. A variety of suitable branch prediction algorithms may be employed by branch prediction unit 14.

Instructions fetched from instruction cache 16 are conveyed to instruction alignment unit 18. As instructions are fetched from instruction cache 16, the corresponding predecode data is scanned to provide information to instruction alignment unit 18 (and to MROM unit 34) regarding the instructions being fetched. Instruction alignment unit 18 utilizes the scanning data to align an instruction to each of decode units 20. In one embodiment, instruction alignment unit 18 aligns instructions from three sets of eight instruction bytes to decode units 20. Decode unit 20A receives an instruction which is prior to instructions concurrently received by decode units 20B and 20C (in program order). Similarly, decode unit 20B receives an instruction which is prior to the instruction concurrently received by decode unit 20C in program order.

Decode units 20 are configured to decode instructions received from instruction alignment unit 18. Register operand information is detected and routed to register file 30 and reorder buffer 32. Additionally, if the instructions require one or more memory operations to be performed, decode units 20 dispatch the memory operations to load/store unit 26. Each instruction is decoded into a set of control values for functional units 24, and these control values are dispatched to reservation stations 22 along with operand address information and displacement or immediate data which may be included with the instruction. In one particular embodiment, each instruction is decoded into up to two operations which may be separately executed by functional units 24A–24C.

Processor 10 supports out of order execution, and thus employs reorder buffer 32 to keep track of the original program sequence for register read and write operations, to implement register renaming, to allow for speculative instruction execution and branch misprediction recovery, and to facilitate precise exceptions. A temporary storage location within reorder buffer 32 is reserved upon decode of an instruction that involves the update of a register to thereby store speculative register states. If a branch prediction is incorrect, the results of speculatively-executed instructions along the mispredicted path can be invalidated in the buffer before they are written to register file 30. Similarly, if a particular instruction causes an exception, instructions subsequent to the particular instruction may be discarded. In this manner, exceptions are "precise" (i.e. instructions subsequent to the particular instruction causing the exception are not completed prior to the exception). It is noted that a particular instruction is speculatively executed if it is executed prior to instructions which precede the particular instruction in program order. Preceding instructions may be a branch instruction or an exception-causing instruction, in which case the speculative results may be discarded by reorder buffer 32.

The instruction control values and immediate or displacement data provided at the outputs of decode units 20 are routed directly to respective reservation stations 22. In one embodiment, each reservation station 22 is capable of holding instruction information (i.e., instruction control values as well as operand values, operand tags and/or immediate data) for up to six pending instructions awaiting issue to the corresponding functional unit. It is noted that for the embodiment of FIG. 1, each reservation station 22 is associated with a dedicated functional unit 24. Accordingly, three dedicated "issue positions" are formed by reservation stations 22 and functional units 24. In other words, issue position 0 is formed by reservation station 22A and functional unit 24A. Instructions aligned and dispatched to reservation station 22A are executed by functional unit 24A.

Similarly, issue position 1 is formed by reservation station 22B and functional unit 24B; and issue position 2 is formed by reservation station 22C and functional unit 24C.

Upon decode of a particular instruction, if a required operand is a register location, register address information is routed to reorder buffer 32 and register file 30 simultaneously. Those of skill in the art will appreciate that the x86 register file includes eight 32 bit real registers (i.e., typically referred to as EAX, EBX, ECX, EDX, EBP, ESI, EDI and ESP). In embodiments of processor 10 which employ the x86 processor architecture, register file 30 comprises storage locations for each of the 32 bit real registers. Additional storage locations may be included within register file 30 for use by MROM unit 34. Reorder buffer 32 contains temporary storage locations for results which change the contents of these registers to thereby allow out of order execution. A temporary storage location of reorder buffer 32 is reserved for each instruction which, upon decode, is determined to modify the contents of one of the real registers. Therefore, at various points during execution of a particular program, reorder buffer 32 may have one or more locations which contain the speculatively executed contents of a given register. If following decode of a given instruction it is determined that reorder buffer 32 has a previous location or locations assigned to a register used as an operand in the given instruction, the reorder buffer 32 forwards to the corresponding reservation station either: 1) the value in the most recently assigned location, or 2) a tag for the most recently assigned location if the value has not yet been produced by the functional unit that will eventually execute the previous instruction. If reorder buffer 32 has a location reserved for a given register, the operand value (or reorder buffer tag) is provided from reorder buffer 32 rather than from register file 30. If there is no location reserved for a required register in reorder buffer 32, the value is taken directly from register file 30. If the operand corresponds to a memory location, the operand value is provided to the reservation station through load/store unit 26.

In one particular embodiment, reorder buffer 32 is configured to store and manipulate concurrently decoded instructions as a unit. This configuration will be referred to herein as "line-oriented". By manipulating several instructions together, the hardware employed within reorder buffer 32 may be simplified. For example, a line-oriented reorder buffer included in the present embodiment allocates storage sufficient for instruction information pertaining to three instructions (one from each decode unit 20) whenever one or more instructions are dispatched by decode units 20. By contrast, a variable amount of storage is allocated in conventional reorder buffers, dependent upon the number of instructions actually dispatched. A comparatively larger number of logic gates may be required to allocate the variable amount of storage. When each of the concurrently decoded instructions has executed, the instruction results are stored into register file 30 simultaneously. The storage is then free for allocation to another set of concurrently decoded instructions. Additionally, the amount of control logic circuitry employed per instruction is reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that storing instruction results into register file 30 and freeing the corresponding storage is referred to as "retiring" the instructions. It is further noted that any reorder buffer configuration may be employed in various embodiments of processor 10.

As noted earlier, reservation stations 22 store instructions until the instructions are executed by the corresponding functional unit 24. An instruction is selected for execution if: (i) the operands of the instruction have been provided; and (ii) the operands have not yet been provided for instructions which are within the same reservation station 22A–22C and which are prior to the instruction in program order. It is noted that when an instruction is executed by one of the functional units 24, the result of that instruction is passed directly to any reservation stations 22 that are waiting for that result at the same time the result is passed to update reorder buffer 32 (this technique is commonly referred to as "result forwarding"). An instruction may be selected for execution and passed to a functional unit 24A–24C during the clock cycle that the associated result is forwarded. Reservation stations 22 route the forwarded result to the functional unit 24 in this case. In embodiments in which instructions may be decoded into multiple operations to be executed by functional units 24, the operations may be scheduled separately from each other.

In one embodiment, each of the functional units 24 is configured to perform integer arithmetic operations of addition and subtraction, as well as shifts, rotates, logical operations, and branch operations. The operations are performed in response to the control values decoded for a particular instruction by decode units 20. It is noted that a floating point unit (not shown) may also be employed to accommodate floating point operations. The floating point unit may be operated as a coprocessor, receiving instructions from MROM unit 34 or reorder buffer 32 and subsequently communicating with reorder buffer 32 to complete the instructions. Additionally, functional units 24 may be configured to perform address generation for load and store memory operations performed by load/store unit 26. In one particular embodiment, each functional unit 24 may comprise an address generation unit for generating addresses and an execute unit for performing the remaining functions. The two units may operate independently upon different instructions or operations during a clock cycle.

Each of the functional units 24 also provides information regarding the execution of conditional branch instructions to the branch prediction unit 14. If a branch prediction was incorrect, branch prediction unit 14 flushes instructions subsequent to the mispredicted branch that have entered the instruction processing pipeline, and causes fetch of the required instructions from instruction cache 16 or main memory. It is noted that in such situations, results of instructions in the original program sequence which occur after the mispredicted branch instruction are discarded, including those which were speculatively executed and temporarily stored in load/store unit 26 and reorder buffer 32. It is further noted that branch execution results may be provided by functional units 24 to reorder buffer 32, which may indicate branch mispredictions to functional units 24 and branch prediction unit 14.

Results produced by functional units 24 are sent to reorder buffer 32 if a register value is being updated, and to load/store unit 26 if the contents of a memory location are changed. If the result is to be stored in a register, reorder buffer 32 stores the result in the location reserved for the value of the register when the instruction was decoded. A plurality of result buses 38 are included for forwarding of results from functional units 24 and load/store unit 26. Result buses 38 convey the result generated, as well as the reorder buffer tag identifying the instruction being executed.

Load/store unit 26 provides an interface between functional units 24 and data cache 28. In one embodiment, load/store unit 26 is configured with a first load/store buffer having storage locations for data and address information for pending loads or stores which have not accessed data cache 28 and a second load/store buffer having storage locations for data and address information for loads and stores which have access data cache 28. For example, the first buffer may comprise 12 locations and the second buffer may comprise 32 locations. Decode units 20 arbitrate for access to the load/store unit 26. When the first buffer is full, a decode unit must wait until load/store unit 26 has room for the pending load or store request information. Load/store unit 26 also performs dependency checking for load memory operations against pending store memory operations to ensure that data coherency is maintained. A memory operation is a transfer of data between processor 10 and the main memory subsystem. Memory operations may be the result of an instruction which utilizes an operand stored in memory, or may be the result of a load/store instruction which causes the data transfer but no other operation. Additionally, load/store unit 26 may include a special register storage for special registers such as the segment registers and other registers related to the address translation mechanism defined by the x86 processor architecture.

Data cache 28 is a high speed cache memory provided to temporarily store data being transferred between load/store unit 26 and the main memory subsystem. In one embodiment, data cache 28 has a capacity of storing up to 64 kilobytes of data in an two way set associative structure. It is understood that data cache 28 may be implemented in a variety of specific memory configurations, including a set associative configuration, a fully associative configuration, a direct-mapped configuration, and any suitable size of any other configuration.

In one particular embodiment of processor 10 employing the x86 processor architecture, instruction cache 16 and data cache 28 are linearly addressed and physically tagged. The linear address is formed from the offset specified by the instruction and the base address specified by the segment portion of the x86 address translation mechanism. Linear addresses may optionally be translated to physical addresses for accessing a main memory. The linear to physical translation is specified by the paging portion of the x86 address translation mechanism. The physical address is compared to the physical tags to determine a hit/miss status.

Bus interface unit 37 is configured to communicate between processor 10 and other components in a computer system via a bus. For example, the bus may be compatible with the EV-6 bus developed by Digital Equipment Corporation. Alternatively, any suitable interconnect structure may be used including packet-based, unidirectional or bi-directional links, etc. Bus interface unit 37 may further communicate In one implementation, L2 cache 39 may be a second level cache storing both instructions and data. L2 cache 39 may be, for example, 256 kilobytes, 512 kilobytes, or 1 Megabyte in size. Other embodiments may use smaller or larger sizes. L2 cache 39 may employ direct mapped or set associative configurations.

Dynamic Prefetch

Figure 2:
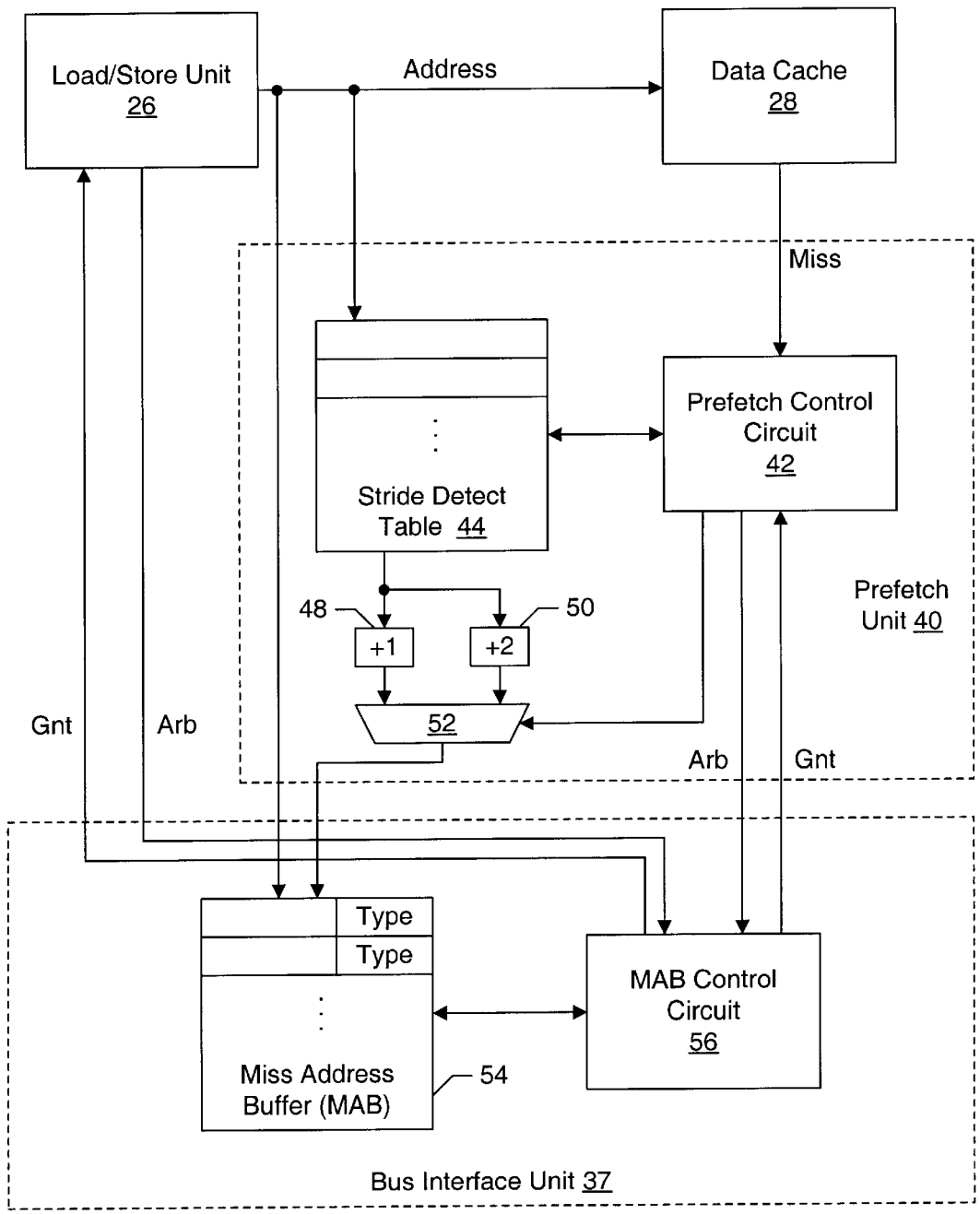
FIG. 2 is a block diagram of one embodiment of a load/store unit, a data cache, and a bus interface unit shown in FIG. 1 and a stride detect table and a prefetch control circuit.

Turning now to FIG. 2, a block diagram illustrating one embodiment of load/store unit 26, data cache 28, a prefetch unit 40, and bus interface unit 37 is shown. Other embodiments are possible and contemplated. In the embodiment of FIG. 2, prefetch unit 40 includes a prefetch control circuit 42, a stride detect table 44, incrementors 48 and 50, and a multiplexor (mux) 52. Bus interface unit 37 includes a miss address buffer, or MAB, 54 and MAB control circuit 56. Load/store unit 26 is coupled to provide an address to data cache 28, MAB 54 and stride detect table 44 and is further coupled to MAB control circuit 56 via an arb/grant interface. Data cache 28 is coupled to provide a miss signal to prefetch control circuit 42. Prefetch control circuit 42 is coupled to stride detect table 44 and to mux 52. Stride detect table 44 is coupled to incrementors 48 and 50, which are further coupled to mux 52. Mux 52 is further coupled to MAB 54. Prefetch control circuit 42 is coupled to MAB control circuit 56 via an arb/grant interface.

Generally, prefetch unit 40 is configured to generate prefetch addresses. Prefetch unit 40 monitors the addresses that miss data cache 28 in order to detect patterns in the miss stream, and generates prefetch addresses in response to the detected patterns. More particularly, prefetch unit 40 may attempt to detect a stride access pattern among miss addresses and may generate the next address in the pattern if a strided access pattern is detected. A stride access pattern may exist if consecutive addresses in the pattern are separated by a fixed stride amount. Other addresses which are not included in the pattern may intervene between consecutive addresses in the pattern. The next address in the pattern may be generated by adding the stride amount to the most recent address in the pattern.

Prefetch unit 40 employs stride detect table 44 to record information from the miss addresses which have been observed by prefetch unit 40. Stride detect table 44 comprises at least one entry, and may include N entries (where N is any positive integer). Each entry may represent a pattern of miss addresses, where consecutive addresses within the pattern are separated by a fixed stride amount. The most recent address of a given pattern may be recorded in the corresponding entry of the stride detect table 44, along with a confidence counter which is indicative of the number of addresses detected in that pattern. The more addresses which have matched the pattern, the more likely the pattern may be to repeat itself in the future. Prefetch control circuit 42 may receive the miss signal from data cache 28 (which may indicate, when asserted, that the address presented to data cache 28 by load/store unit 26 is a miss in data cache 28), and may update the stride detect table when a miss address is received. While a miss signal is used in the present embodiment, other embodiments may use a hit signal or any other indication of the hit/miss status of an address presented to data cache 28.

When a miss address is received by prefetch control circuit 42, the miss address is compared to the addresses recorded in stride detect table 44 to determine if the miss address matches any of the recorded patterns. If prefetch control circuit 42 detects that the miss address matches one of the recorded patterns, prefetch control circuit 42 may increment the confidence counter in the corresponding entry and may store the miss address in the corresponding entry. If the miss address does not match one of the recorded patterns, prefetch control circuit 42 may allocate an entry in stride detect table 44 to the address. In this manner, new patterns of stride patterns may be detected.

Prefetch control circuit 42 may apply a first threshold to the confidence counters in stride detect table 44 to determine if prefetching is to be initiated for the corresponding stride patterns. If a given confidence counter meets or exceeds (is greater than or equal to) the first threshold, a prefetch address may be generated from the address in the entry corresponding to that confidence counter. More particularly, the most recent address and the stride may be added to produce the prefetch address. The incrementor 48 is used to add the stride to the most recent address (selected from stride detect table 44 by prefetch control circuit 42), and prefetch control circuit 42 may select the address from incrementor 48 through mux 52.

Prefetch unit 40 may include a more aggressive prefetch mode based on a second threshold of the confidence counters in stride detect table 44. In the more aggressive mode, a larger value may be added to the most recent address to generate a prefetch address (e.g. twice the stride may be added). Incrementor 50 is provided to generate the more aggressive address, and provides the address to mux 52. Prefetch control circuit 42 may select the more aggressive address through mux 52 as the prefetch address provided to bus interface unit 37.

By providing a second threshold (which may be greater than the first threshold used to initiate prefetching), more aggressive prefetching may be performed for patterns which have exhibited a greater degree of repetition. By prefetching farther ahead for such patterns, effective memory latency may be further reduced for cases in which the next address in the pattern is encountered (e.g. presented by load/store unit 26 in response to a memory operation) before the corresponding cache line is prefetched into the cache. While twice the stride is used as an example, any larger size may be used (e.g. three times the stride, four times the stride, etc.). Furthermore, additional thresholds may be used to generate more levels of aggressiveness in the prefetch (e.g. an initial mode in which the stride is added at a first threshold, a more aggressive mode in which twice the stride is added at a second threshold, a still more aggressive mode in which three times the stride is added at a third threshold, etc.).

As mentioned above, in the illustrated embodiment, prefetch unit 40 monitors the addresses which miss data cache 28. By monitoring the miss addresses, the addresses which hit in data cache 28 may be filtered out, and thus the number of patterns which need to be recorded in any given case to provide accurate prefetching may be smaller (allowing for a smaller stride detect table 44). Furthermore, addresses which are hitting in data cache 28 may not benefit as much from prefetching, and thus ignoring the hit addresses may not impact the performance benefits of prefetching. Still further, in the illustrated embodiment, cache misses from data cache 28 may occur in program order. Other misses, such as L2 cache misses, may not occur in program order and thus detecting a stride pattern may be more difficult (since the pattern exists among consecutive addresses in the pattern). Other embodiments may monitor all addresses presented to data cache 28, if desired.

Prefetch unit 40 (and more particularly prefetch control circuit 42) may arbitrate for a miss address buffer entry for prefetch addresses with load/store unit 26 (which is performing memory operations in response to the actual instruction execution). Generally, miss address buffer 54 may comprise one or more entries for addresses which miss in the caches of processor 10 and thus are to be conveyed to the memory system to fetch the corresponding cache line for storage in the cache (and for use by processor 10). MAB control circuit 56 may control the arbitration and allocation of MAB entries to load/store unit 26 and/or prefetch unit 40. Accordingly, arb/grant interfaces between load/store unit 26 and MAB control circuit 56 and between prefetch control circuit 42 and MAB control circuit 56 are shown in FIG. 2. Other sources may arbitrate for MAB entries as well, as desired (e.g. instruction cache 16 may arbitrate for instruction fetch misses). In response to determining that a prefetch should begin, prefetch control circuit 42 asserts its arb signal to MAB control circuit 56. If MAB control circuit 56 grants a MAB entry to prefetch unit 40, MAB control circuit 56 asserts the grant (Gnt) signal to prefetch control circuit 42. Prefetch control circuit 42 may then arbitrate for another prefetch address, if desired, or may deassert its arb signal.

Similarly, if load/store unit 26 is ready to initiate a fill for a memory operation which misses data cache 28, load/store unit 26 may assert its arb signal to arbitrate for a MAB entry. If MAB control circuit 56 grants a MAB entry to load/store unit 26, MAB control circuit 56 may assert the grant (Gnt) signal to load/store unit 26. Load/store unit 26 may also receive a tag indicative of the allocated MAB entry, so that the subsequently provided cache line may be matched with the original memory operation. In some embodiments, described in further detail below, prefetch control circuit 42 may also receive a tag. If both load/store unit 26 and prefetch unit 40 are arbitrating for a MAB entry, load/store unit 26 may be-given priority since load/store unit 26 is performing load/store memory operations from the code being executed by processor 10 while prefetch unit 40 is generating prefetch addresses which are not directly in response to the code being executed.

Generally, a MAB entry may store the address to be fetched from memory and may also store a type field (Type in FIG. 2) indicating the type of request being performed. Various type encodings may be provided for load memory operations (which may result in a read command on the bus), store memory operations (which may result in a read as well, but with the requirement that processor 10 be granted write ability to the cache line), etc. Additionally, a type field encoding may be assigned for prefetches.

In one embodiment, processor 10 may store prefetched cache lines into the L2 cache 39. For such an embodiment, bus interface unit 37 may detect the prefetch type field encoding and may route the prefetched cache line to L2 cache 39 for storage. By prefetching into L2 cache 39, pollution of the data cache 28 may be avoided (i.e. the replacing of useful data with prefetch data which may not be used). Pollution may be less of a factor in the larger L2 cache than it is for data cache 28, since the L2 cache is larger and may, in some cases, have a higher set associativity. Prefetching into the L2 may be preferable to prefetching into a dedicated buffer, since the area to implement the buffer is not consumed and the complexity of routing prefetch cache lines to the dedicated buffer (rather than one of the caches) may be avoided.

As used herein, a "level one" (L1) cache may be the cache which is accessed first in the cache hierarchy by the processor to respond to a memory operation required by the code sequence being executed. Thus, in the embodiment of FIG. 2, data cache 28 may be an L1 cache. The "level two" (L2) cache may be the next cache down the hierarchy from the L1 cache, and thus may be accessed after the L1 cache. In some cases, the L1 and L2 accesses may be started concurrently, and the L2 access may be cancelled if the L1 access is a hit. Furthermore, a "hit" in a cache occurs if the data corresponding to an address is stored in the cache when the address accesses the cache, and a "miss" in a cache occurs if the data is not stored in the cache when the address accesses the cache. A "cache line" is the smallest unit of allocation and deallocation of memory in the cache.

It is noted that processor 10 may detect the scenario in which a prefetch address is generated by prefetch unit 40 and, before the prefetched cache line is provided by the system, load/store unit 26 generates that address for a load or store memory operation. Processor 10 may, in response to detecting the scenario, directly forward the prefetched data for the load or store memory operation.

It is noted that, in one embodiment, prefetch unit 40 may operate on physical addresses (i.e. addresses which have been translated through the virtual to physical address translation mechanism of processor 10). In this manner, translation of prefetch addresses may be avoided. Additionally, in such embodiments, prefetch unit 40 may not generate prefetch addresses which cross a page boundary (since virtual pages may be arbitrarily mapped to physical pages, a prefetch in the next physical page may not be part of the same stride pattern of virtual addresses). Thus, incrementors 48 and 50 may increment only the in-page portion of the address (e.g. bits 11:6 for a 4 kilobyte page size and 64 byte cache lines), and a carry out of bit 11 may be used to inhibit the prefetch.

It is further noted that, while incrementors 48 and 50 are shown in FIG. 2 for generating prefetch addresses, other embodiments may generate the prefetch addresses from the miss address as the miss address is stored into the table, and may store the prefetch addresses in the entry with the miss address. Alternatively, just the address incremented by one stride amount may be stored, and the address incremented by two stride amounts may be generated with an incrementor similar to incrementor 48.

Turning next to FIGS. 3–7, one embodiment of prefetch unit 40 is described which detects stride patterns in which the stride value is predetermined (e.g. hardwired, or programmable in a configuration register). Particularly, a stride of one cache line is used. In other words, patterns of consecutive cache lines are detected for the embodiment of FIGS. 3–7. Other embodiments could use any predetermined stride value. For the embodiment of FIGS. 3–7, the incrementors 48 and 50 are configured to add the stride value of one and two cache lines, respectively, to the address read from the table. In the discussion below, the terms "+1 address", "plus one address", "address+1" or "address plus one" may be used for brevity. In the embodiment of FIGS. 3–7, these terms may refer to the address plus one cache line. More generally, these terms may refer to the address plus one stride amount. Similarly, the terms "+2 address", "plus two address", "address+2" or "address plus two" may be used for brevity. In the embodiment of FIGS. 3–7, these terms may refer to the address plus two cache lines. More generally, these terms may refer to the address plus twice the stride amount.

Figure 3:
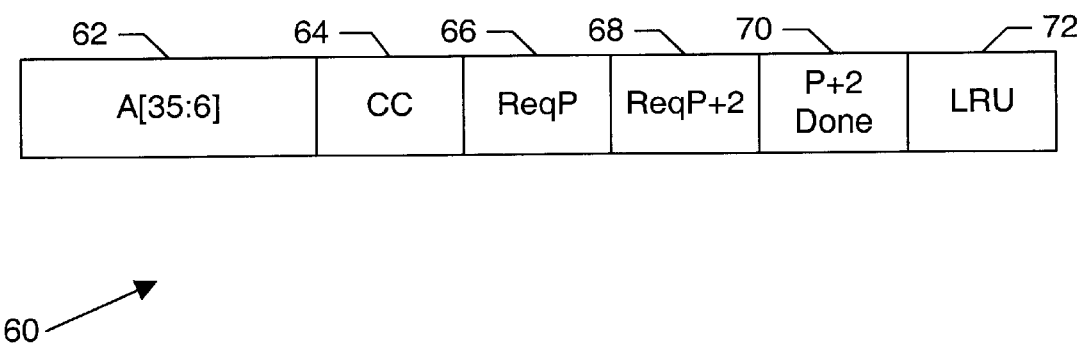
FIG. 3 is a block diagram of one embodiment of an entry in the stride detect table.

FIG. 3 is a block diagram of one embodiment of an entry 60 which may be employed within one embodiment of stride detect table 44. Other embodiments are possible and contemplated. In the embodiment of FIG. 3, entry 60 includes an address field 62, a confidence counter (CC) field 64, a request prefetch (ReqP) field 66, a request prefetch plus 2 (ReqP+2) field 68, a prefetch plus 2 done (P+2Done) field 70, and a least recently used field (LRU) 72.

Address field 62 stores the most recent address which was detected by prefetch control circuit 42 to be part of the strided access pattern represented by entry 60. As illustrated by the bit range in field 62 in FIG. 3, a portion of the address may be stored. Particularly, the bits of the address which are not part of the cache line offset may be stored. In the illustrated embodiment, 36 bit physical addresses may be supported. Other embodiments may support more or fewer physical address bits. The cache line offset portion (in this case, 6 bits since cache lines are 64 bits, although other embodiments may employ different cache line sizes) is not stored since cache lines are prefetched in response to prefetch addresses generated by prefetch unit 40 and thus strides of less than a cache line are not of interest to prefetch unit 40. Viewed in another way, the granularity of addresses in prefetch unit 40 is a cache line granularity. Any granularity may be used in other embodiments, including larger and smaller granularities. Generally, addresses are said to "match" if the bits which are significant to the granularity in use are equal. For example, if a cache line granularity is used, the bits which are significant are the bits excluding the cache line offset bits. Accordingly, addresses match in the embodiment of FIGS. 3–7 if bits 35:6 of the two addresses are equal.

Confidence counter field 64 stores the confidence counter for entry 60. As mentioned above, the confidence counter is incremented each time another address in the pattern is detected.

ReqP field 66, ReqP+2 field 68, and P+2Done field 70 store indications of the prefetches which are being requested from entry 60. Generally, the indications in fields 66, 68, and 70 represent the prefetch request state of entry 60, and may be used by prefetch control circuit 42 to record the state and change the state of the prefetch requests for the entry 60. Any state encoding may be used, in alternative embodiments.

The ReqP field 66 stores a ReqP indication indicative of whether or not the next address in the pattern is to be prefetched (i.e. the +1 address). The ReqP indication may be any value which, in a first state, indicates that the +1 address is to be prefetched and, in a second state, indicates that the +1 address is not to be prefetched. In one embodiment, the ReqP indication may be a bit indicative, when set, that the +1 address is to be prefetched and indicative, when clear, that the +1 address is not to be prefetched. While the remainder of this discussion will refer to the above mentioned embodiment, other embodiments may use the opposite definition of the set and clear states, or any other value. Similarly, the ReqP+2 and P+2Done indications may be referred to as bits, but may be any suitable indication.

The ReqP+2 field 68 stores a ReqP+2 bit that is indicative, when set, that a prefetch of the most recent address plus two times the stride (i.e. the +2 address) is being requested and is indicative, when clear, that a prefetch of the +2 address is not being requested. The P+2Done field 70 stores a P+2Done bit which is indicative, when set, that a prefetch of the +2 address has successfully been initiated from entry 60 and is indicative, when clear, that a prefetch of the +2 address has not successfully been initiated from entry 60. The P+2Done bit may be used to determine which prefetch to request (the +1 or +2 address) in response to subsequent address matches on entry 60, as described in more detail below.

Finally, LRU field 72 stores an LRU value ranking the recentness of entry 60 among the entries in stride detect table 44. The least recently used entry may be replaced when an address not fitting any of the patterns in stride detect table 44 is detected, and prefetch unit 40 attempts to track a new pattern beginning with that address. While LRU is used in the present embodiment, any replacement strategy may be used (e.g. modified LRU, random, etc.).

Figure 4:
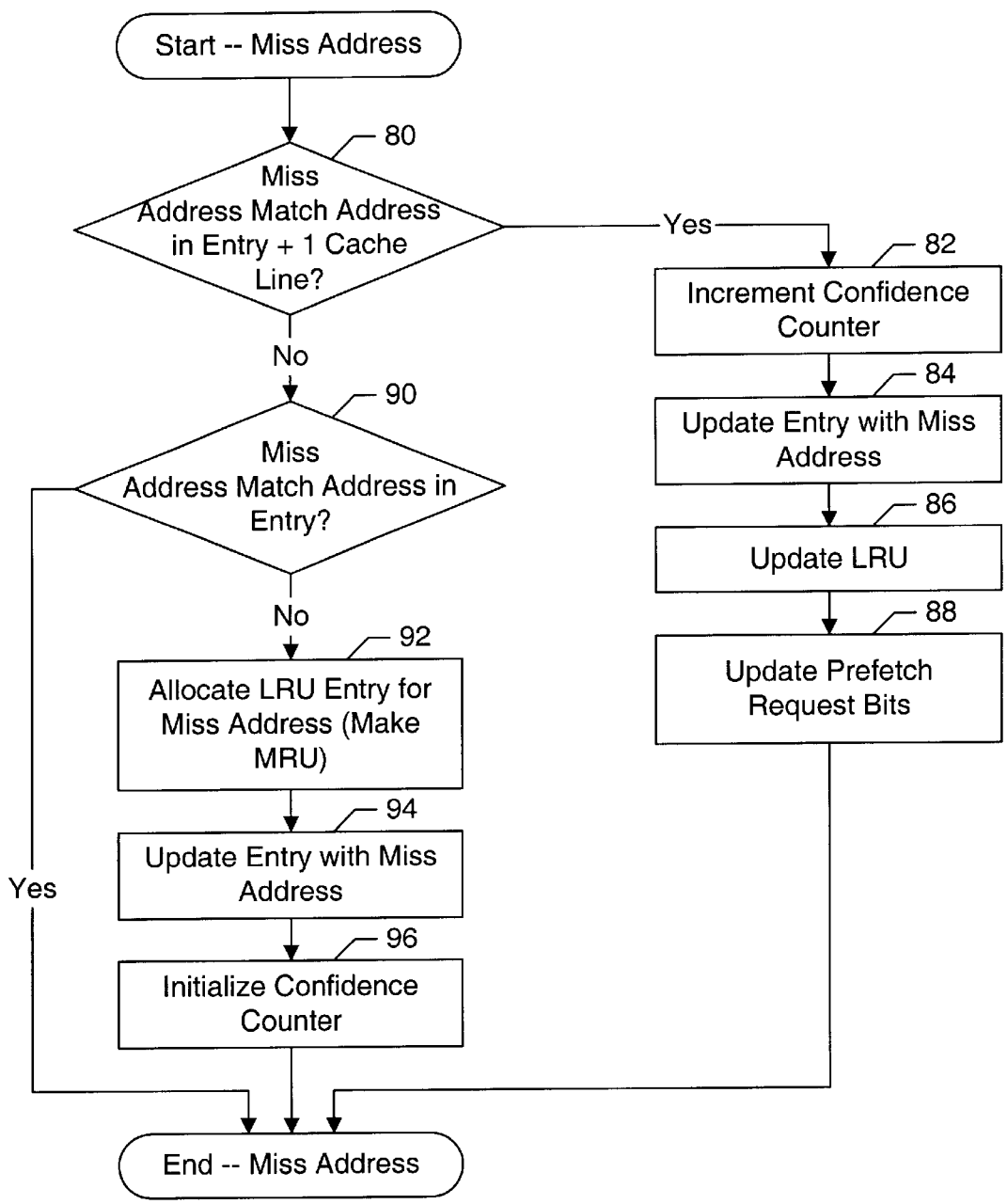
FIG. 4 is a flowchart illustrating operation of one embodiment of the prefetch control circuit in response to a miss address received by the stride detect table.

Turning now to FIG. 4, a flowchart is shown illustrating operation of one embodiment of prefetch control circuit 42 in response to receiving a miss address from load/store unit 26 and data cache 28. Other embodiments are possible and contemplated. The blocks of the flowchart in FIG. 4 may be representative of combinatorial logic circuitry in prefetch control circuit 42 and thus, while the blocks are illustrated in a particular order for ease of understanding, the blocks may be performed in parallel by such circuitry.

Prefetch control circuit 42 determines if the-miss address matches the +1 address for the entry (decision block 80). If the miss address matches the +1 address, the miss address is the next address in the pattern represented by the entry. The matching of the miss address to the +1 address is done on a cache line granularity, as mentioned above. The matching may be accomplished in a variety of ways. For example, the miss address may be decremented prior to performing the comparison. The address in the entry may be incremented prior to performing the comparison, or the +1 address could be stored in the entry (instead of or in addition to the most recent address). The circuitry doing the comparison could integrate the plus one in the comparison.

If the miss address does match the +1 address for the entry, prefetch control circuit 42 increments the confidence counter in the entry (block 82). Additionally, the entry is updated with the miss address (e.g. the portion excluding the cache line offset may be stored in the entry) (block 84). The LRU value in the entry (and other entries) is updated to indicate that the entry is most recently used (block 86). Additionally, the prefetch request bits may be updated based on the value of the confidence counter (block 88). The update of the prefetch request bits is illustrated in more detail in FIG. 5 below.

Prefetch control circuit 42 also determines if the miss address matches the address in the entry (decision block 90). It is noted that decision block 80 and decision block 90 are independent and thus may be performed in parallel or in either order. If the miss address matches the address in the entry, then no action is taken. The miss address may already be in the process of being fetched from the memory system, and may simply be another load or store memory operation to the same cache line.

If the miss address does not match either the address in the entry or the +1 address in the entry (for each of the entries in stride detect table 44), the miss address does not belong to any of the patterns currently being tracked by prefetch unit 40. The miss address may be part of a pattern not currently being tracked. Accordingly, prefetch control circuit 42 may allocate the LRU entry of stride detect table 44 for the address (block 92). The LRU information in stride detect table 44 may be updated to indicate that the entry is most recently used (MRU). Additionally, the entry is updated with the miss address (block 94) and the confidence counter is initialized (block 96). The initial value may be zero, or may be one to reflect that the miss address has been detected, as desired.

The blocks shown in FIG. 4 illustrate the operation of prefetch control circuit 42 with respect to one entry of stride detect table 44 (except for blocks 92, 94, and 96, which represent the action if no entry includes a match). Prefetch control circuit 42 may include circuitry to perform the blocks of FIG. 4 on each entry in parallel, or may scan through the entries, as desired.

Since the prefetch request bits are updated in response to a miss address matching a particular entry, prefetch unit 40 may only request additional prefetches as the corresponding pattern continues to be observed by prefetch unit 40. In other words, detecting the fetch of another address in the pattern (in response to a load or store memory operation being performed by processor 10) triggers the next prefetch request. Accordingly, the number of prefetches beyond the currently fetched address may be, at most, a certain number of cache lines ahead in the pattern from the currently accessed cache line. The number of cache lines ahead may be based on the confidence counter and the thresholds, and is thus dynamic. If the pattern ceases to repeat, prefetches of additional cache lines in that pattern may cease as well. In the present embodiment, for example, the current address +2 may be prefetched in the aggressive mode if the confidence counter meets or exceeds the second threshold. In such an embodiment, a maximum of two cache lines beyond the last repetition of the pattern may be prefetched when the pattern ceases to repeat.

Figure 5:
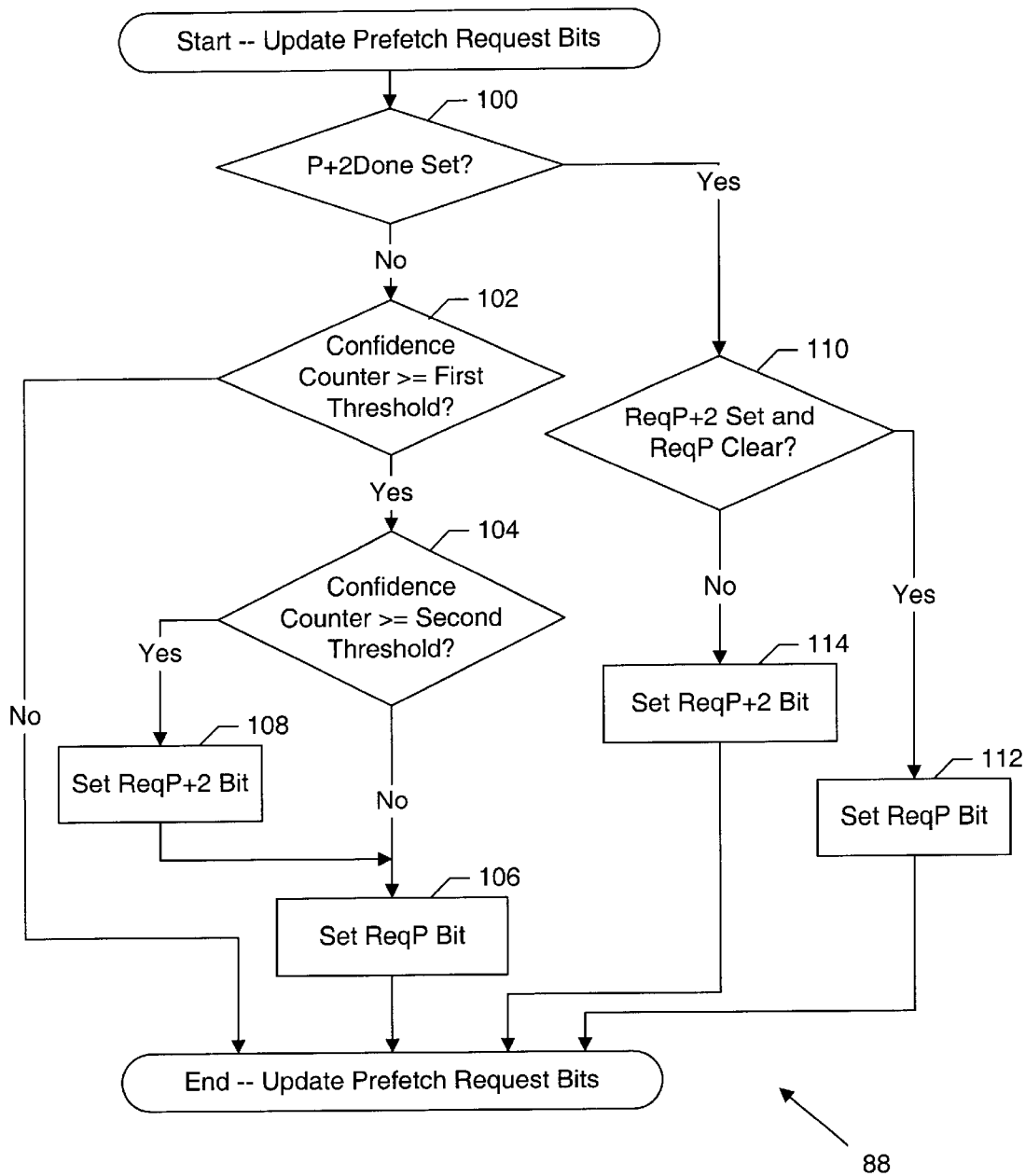
FIG. 5 is a flowchart illustrating one embodiment of an update prefetch request bits block in FIG. 4.

Turning now to FIG. 5, a flowchart illustrating one embodiment of the update prefetch request bits block 88 is shown. Other embodiments are possible and contemplated. The blocks of the flowchart in FIG. 5 may be representative of combinatorial logic circuitry in prefetch control circuit 42 and thus, while the blocks are illustrated in a particular order for ease of understanding, the blocks may be performed in parallel by such circuitry.

Prefetch control circuit 42 may handle the prefetch request bits in a slightly different fashion dependent upon whether or not a prefetch for the +2 address has successfully been transmitted to MAB 54. In part, the difference has to do with whether or not a prefetch of the +1 address is also requested, to ensure that a cache line is not inadvertently skipped during the transition from the less aggressive mode to the more aggressive mode (when the confidence counter meets or exceeds the second threshold). If prefetch unit 40 prefetched only the +2 address when the confidence counter met the threshold for the first time, then the prefetch of the +1 address would be skipped (and a cache miss would occur for that cache line if subsequently accessed by a load or store memory operation). Accordingly, if the prefetch of the +2 address has not been successfully transmitted and the confidence counter meets or exceeds the second threshold, a prefetch of both the +1 address and the +2 address may be requested by setting both the ReqP bit and the ReqP+2 bit. Other embodiments may elect to skip the +1 prefetch once the second threshold has been met or exceeded, if desired.

The operation described in the preceding paragraph is illustrated by the operation if the P+2Done bit is clear (decision block 100, "no" leg). If the confidence counter has not met or exceeded the first threshold (decision block 102) then no prefetch is requested. If the confidence counter has met or exceeded the first threshold but not the second threshold (decision block 104), then the prefetch control circuit 42 sets the ReqP bit (block 106). On the other hand, if the confidence counter has met or exceeded both the first and second thresholds, the prefetch control circuit 42 sets both the ReqP+2 bit (block 108) and the ReqP bit (block 106).

Generally, the first and second thresholds may be set according to design choice, as long as the second threshold is greater than the first threshold. They may be hardwired, or may be programmable (e.g. in configuration registers within processor 10). It is noted that decision blocks 102 and 104 may be independent and thus may be erformed in parallel or in either order.

If the prefetch of the +2 address has been successful transmitted to MAB 54, then prefetch control circuit 42 may generally set just the ReqP+2 bit in response to a miss address matching the next address in the pattern. However, one case may be considered. If the ReqP+2 bit is still set when a miss address matches the +1 address for an entry, the prefetch for the preceding address +2 (which would also be the miss address +1) may not have successfully been transmitted to MAB 54. Accordingly, in this case, it may be desirable to set the ReqP bit to ensure that the prefetch is not skipped. Other embodiments may elect to skip the prefetch, if desired.

The operation described in the preceding paragraph is illustrated by the operation if the P+2Done bit is set (decision block 100, "yes" leg). If the ReqP+2 bit is set and the ReqP bit is clear (decision block 110), the prefetch control circuit 42 sets the ReqP bit (block 112). In other cases, the prefetch control circuit 42 sets the ReqP+2 bit (block 114).

Figure 6:
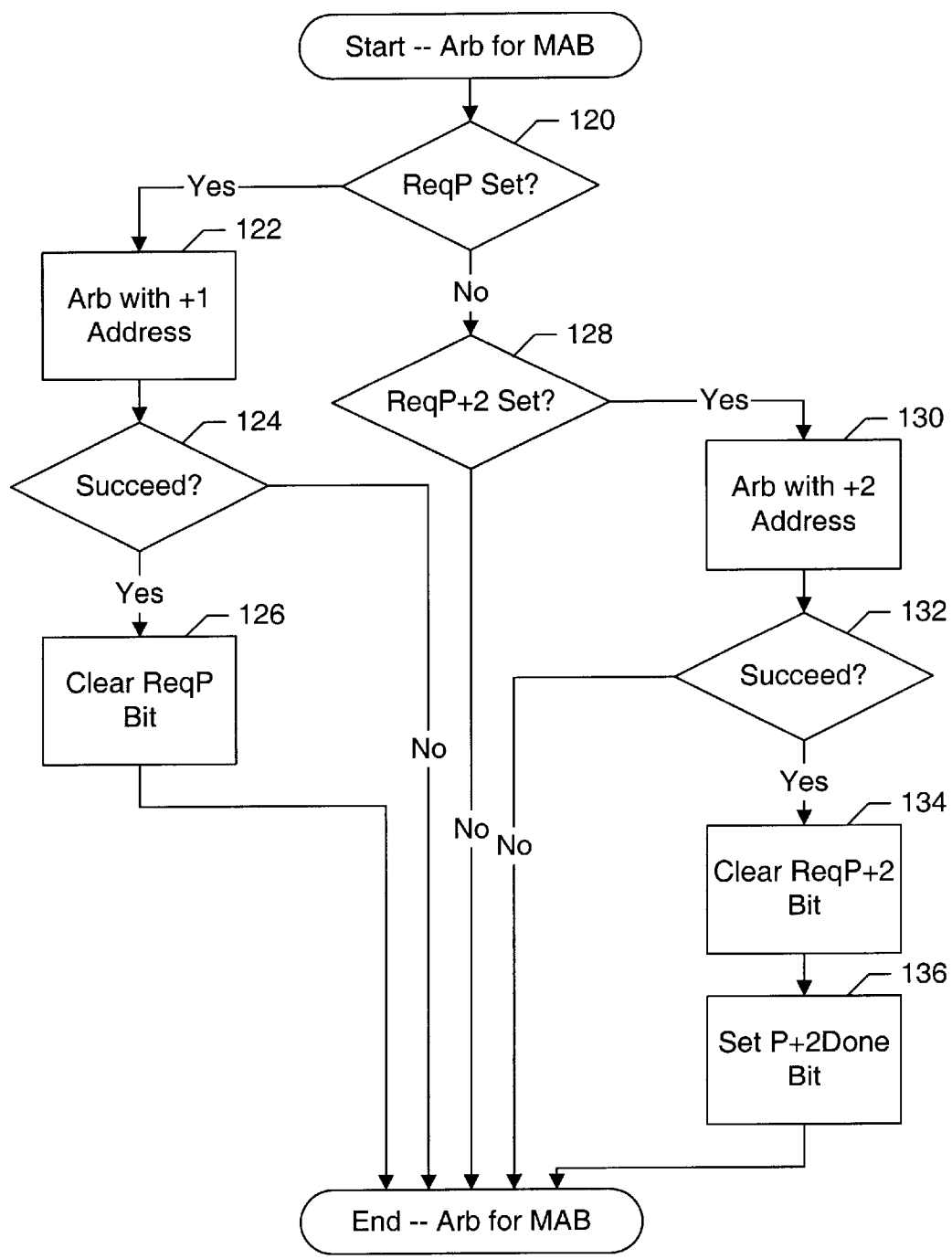
FIG. 6 is a flowchart illustrating operation of one embodiment of the prefetch control circuit in arbitrating for a miss address buffer entry.

Turning now to FIG. 6, a flowchart is shown illustrating operation of one embodiment of prefetch control circuit 42 for arbitration for a MAB entry. Other embodiments are possible and contemplated. The blocks of the flowchart in FIG. 6 may be representative of combinatorial logic circuitry in prefetch control circuit 42 and thus, while the blocks are illustrated in a particular order for ease of understanding, the blocks may be performed in parallel by such circuitry.

The flowchart of FIG. 6 illustrates the selection of a prefetch address with respect to one entry of stride detect table 44. If multiple entries have an ReqP or ReqP+2 bit set, prefetch control circuit 42 may select an entry from the multiple entries. For example, prefetch control circuit 42 may select the entry which is nearest the top of the stride detect table 44 and which has an ReqP or ReqP+2 bit set. Alternatively, the prefetch control circuit 42 may select the most recently used (MRU) or least recently used (LRU) entry based on the LRU fields of the entries. Prefetch control circuit 42 may read the address field 62 of the selected entry, thus providing the address to incrementors 48 and 50.

If the ReqP bit is set (decision block 120), prefetch control circuit 42 arbitrates with a prefetch address equal to the +1 address from the selected entry (block 122). In other words, prefetch control circuit 42 selects the output of incrementor 48 through mux 52 and asserts the arb signal to MAB control circuit 56, for the embodiment of FIG. 2. If the arbitration is successful (i.e. the Gnt signal to prefetch control circuit 42 is asserted—decision block 124), the prefetch control circuit 42 clears the ReqP bit in the entry (block 126). On the other hand, if the arbitration is not successful, the prefetch control circuit 42 may not modify the ReqP bit to allow for arbitration during the next clock cycle.

If the ReqP bit is clear and the ReqP+2 bit is set (decision block 128), prefetch control circuit 42 arbitrates with a prefetch address equal to the +2 address from the selected entry (block 130). In other words, prefetch control circuit 42 selects the output of incrementor 50 through mux 52 and asserts the arb signal to MAB control circuit 56, for the embodiment of FIG. 2. Similar to blocks 124 and 126, if the arbitration is successful (decision block 132), the prefetch control circuit 42 clears the ReqP+2 bit in the entry (block 134). Additionally, since the prefetch address equal to the +2 address from the selected entry has successfully been transmitted to MAB 54, prefetch control circuit 42 sets the P+2Done bit (block 136). On the other hand, if the arbitration is not successful, the prefetch control circuit 42 may not modify the ReqP+2 and P+2Done bits to allow for arbitration during the next clock cycle.

Accordingly, if both the ReqP and ReqP+2 bits are set in an entry, the prefetch address equal to the +1 address from the entry is selected first. This prefetch address is more likely to be needed first (if the pattern continues to repeat). Subsequently, since the ReqP bit is cleared on successful transmission of the prefetch address, the prefetch address equal to the +2 address from the entry may be selected.

It is noted that, in an alternative embodiment, prefetch unit 40 may be allocated a separate port to MAB 54. In such an embodiment, arbitration may be unnecessary and thus blocks 122 and 130 may comprise selecting the prefetch address (e.g. through mux 52) and decision blocks 124 and 132 may be eliminated. It is further noted that, if no entries have the ReqP or ReqP+2 bits set, then prefetch control circuit 42 may not arbitrate for MAB 54.

It is noted that, in the illustrated embodiment, the ReqP and ReqP+2 bits are not cleared until the corresponding prefetch address is successfully transmitted to MAB 54. In other embodiments, the ReqP and ReqP+2 bits may be cleared automatically after the passage of a certain amount of time (e.g. a certain number of clock cycles). Such an embodiment may help prevent the successful transmission of a prefetch address to MAB 54 just before the same address is generated from load/store unit 26 (via repetition of the pattern).

Turning now to FIG. 7, an example of the operation of one embodiment of prefetch unit 40 for an exemplary pattern of miss addresses is shown. Under the column "Miss Address", the addresses which miss data cache 28 are illustrated. Under the column "Prefetch Address", the addresses which are successfully transmitted to MAB 54 are illustrated. The address A is the first miss address in the exemplary pattern. Other addresses are shown a A+1, A+2, etc. The numeral after the plus sign is the number of cache lines added to address A to produce that address. In other words, address A+1 is address A plus one cache line, address A+2 is address A plus two cache lines, etc. Time increases from the top to the bottom of FIG. 7 (e.g. address A occurs as a miss address before address A+1, etc.), although arbitrary amounts of time may elapse between events shown in FIG. 7, and the amount of time between any two events may differ from the amount of time between any two other events. In between the "Miss Address" column and the "Prefetch Address" column, an exemplary entry is illustrated and the updates to the entry in response to receiving the miss address or transmitting the prefetch address are shown. The updates to the entry in response to a particular address are shown in the entry connected by an arrow to that particular address. The headings above the entry illustrate the fields within the entry. For this example, the first threshold (for initiating prefetch of the +1 address from the entry) is 3 and the second threshold (for initiating prefetch of the +2 address from the entry) is 6. Any two thresholds may be selected in other embodiments. The second threshold need not be twice the first threshold.

In response to the miss address A, prefetch control circuit 42 allocates an entry in stride detect table 44 for the address (reference numeral 140). The confidence counter is initialized to zero, and each of the prefetch request bits ReqP, ReqP+2, and P+2Done are cleared. Since the confidence counter does not meet either threshold, no prefetch address is attempted from the entry ("DNA" in the prefetch address column).

In response to the miss address A+1, a match is detected for the +1 address in the entry and thus address A+1 is stored in the entry and the confidence counter is incremented. Again, since the confidence counter does not meet either threshold, no prefetch address is attempted from the entry. Similar operation occurs in response to the miss address A+2.

In response to the miss address A+3, a match is detected for the +1 address in the entry and thus address A+3 is stored in the entry and the confidence counter is incremented (reference numeral 142). Since the confidence counter now meets the first thre shold, the ReqP bit is set in the entry. A prefetch of the +1 address (A+4) is attempted. In response to successful transmission of the A+4 address (address A+4 in the "Prefetch Address" column—reference numeral 144), the ReqP bit is cleared in the entry.

In response to the miss address A+4, a match is detected for the +1 address in the entry and thus address A+4 is stored in the entry and the confidence counter is incremented. Since the confidence counter exceeds the first threshold, the ReqP bit is set in the entry. However, prior to successfully transmitting the +1 prefetch address (A+5), the miss address A+5 is received (reference numeral 146). A match is detected again for the +1 address in the entry and thus address A+5 is stored in the entry and the confidence counter is incremented. Since the confidence counter still exceeds the first threshold but does not meet or exceed the second threshold, the ReqP bit remains set. Subsequently, the prefetch address A+6 is successfully transmitted, and the ReqP bit is cleared (reference numeral 148).

The receipt of address A+5 and the subsequent transmission of prefetch address A+6 illustrates the automatic updating of the prefetch address being requested if subsequent miss addresses within the pattern are received before the prefetch address is successfully transmitted to MAB 54. Since the prefetch address is updated by updating the entry, a prefetch address which has already been received as a miss address may not be transmitted to MAB 54.

In response to the miss address A+6, a match is detected for the +1 address in the entry and thus the address A+6 is stored and the confidence counter is incremented (reference numeral 150). The confidence counter then equals the second threshold. Since the P+2Done bit is clear, both the ReqP and the ReqP+2 bits are set. Subsequently, the prefetch address A+7 (the +1 prefetch address) is successfully transmitted, causing the ReqP bit to be cleared (reference numeral 152). However, prior to successfully transmitting the prefetch address A+8 (the +2 prefetch address while the address A+6 is stored in the entry), the miss address A+7 is received (reference numeral 154). Since the miss address A+7 matches the +1 address in the entry, the entry is updated to the address A+7, and the confidence counter is incremented. Again, since the P+2Done bit is still clear and the confidence counter exceeds the second threshold, both the ReqP and ReqP+2 bits are set.

Subsequently, both the A+8 and A+9 prefetch addresses are successfully transmitted to MAB 54 (reference numerals 156 and 158). The A+8 prefetch address is the +1 address, causing the ReqP bit to be cleared. The A+9 prefetch address is the +2 address, causing the ReqP+2 bit to be cleared and the P+2Done bit to be set. Therefore, in response to receiving the A+8 miss address (reference numeral 160), the ReqP+2 bit is set without setting the ReqP bit. The prefetch address A+10 is successfully transmitted as the +2 address from the entry (reference numeral 162), causing the ReqP+2 bit to be cleared.

In response to the miss address A+9 (reference numeral 164), the ReqP+2 bit is set, similar to receiving the A+8 miss address. Prior to successfully transmitting the A+11 prefetch address, the miss address A+10 is received (reference numeral 166). Since the P+2Done bit is set, the ReqP+2 bit is set, and the ReqP bit is clear, the ReqP bit is set in response to the A+10 miss address. Accordingly, in response the ReqP bit being set, the prefetch address A+11 is transmitted (the +1 address to A+10). Subsequently, the A+12 address (the +2 address to address A+10) is also transmitted in response to the ReqP+2 bit being set. Accordingly, prefetch addresses may not be skipped if not successfully transmitted before the next miss address is received when in the more aggressive prefetch mode.

Figure 8:
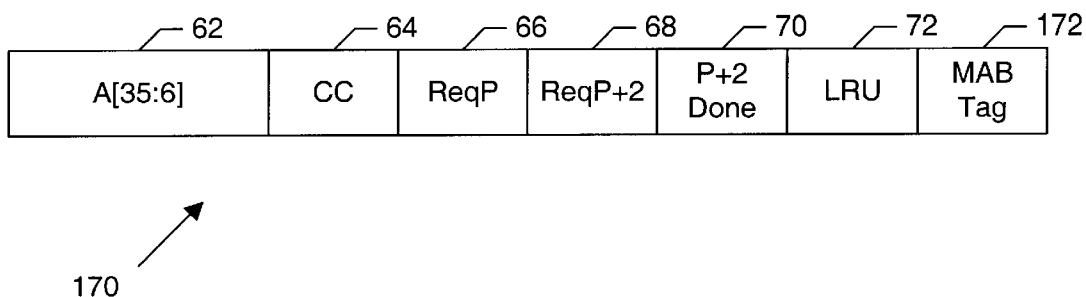
FIG. 8 is a block diagram of a second embodiment of an entry in the stride detect table.
Figure 9:
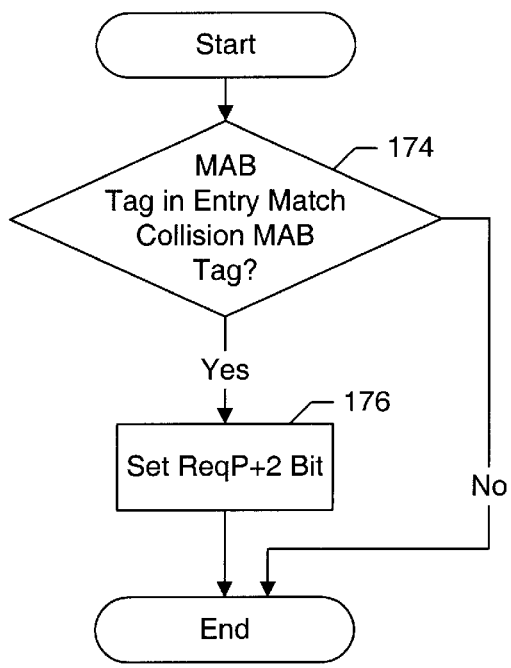
FIG. 9 is a flowchart illustrating operation of one embodiment of the prefetch control circuit for performing collision detection.

Turning next to FIGS. 8–9, an optional collision detection embodiment is shown. The embodiment of FIGS. 8–9 may generally be similar to the embodiment of FIGS. 3–7, with the addition the collision detection illustrated by FIGS. 8–9.

FIG. 8 illustrates a second embodiment of an entry 170 which may be implemented in a second embodiment of stride detect table 44. Other embodiments are possible and contemplated. In the embodiment of FIG. 8, entry 170 includes fields 62, 64, 66, 68, 70, and 72 similar to entry 60 shown in FIG. 3. Additionally, entry 170 includes a MAB tag field 172.

For the embodiment of FIGS. 8–9, in addition to prefetching more aggressively (e.g. the +2 prefetch address) based on the confidence counter and the second threshold, prefetch unit 40 may prefetch more aggressively based on collisions in the MAB 54 between prefetch addresses in the MAB and miss addresses from load/store unit 26 arbitrating for a MAB entry. MAB control circuit 56 may prevent allocation of a MAB entry for an address in the same cache line as an address already in the MAB 54 (a "collision"), in order to prevent multiple memory requests for the same cache line. If MAB control circuit 56 detects a collision with a prefetch address in the MAB 54 and a miss address arbitrating for a MAB entry, MAB control circuit 56 may inform prefetch control circuit 42 of the collision.

In one embodiment, MAB control circuit 56 may convey a MAB tag to prefetch control circuit 42 indicative of the MAB entry allocated to a prefetch address when that prefetch address is allocated to the MAB entry (i.e. successfully transmitted). Prefetch control circuit 42 may store the MAB tag in the entry 170 (particularly in MAB tag field 172) from which the prefetch address was generated.

MAB control circuit 56 may also convey the MAB tag of a prefetch address for which a collision is detected. The flowchart of FIG. 9 illustrates the response to the MAB tag transmitted in response to a collision. The MAB tag is compared to the MAB tags in the entries 170 of stride detect table 44.. If the MAB tag in an entry 170 matches the collision MAB tag provided by MAB control circuit 56 (decision block 174), prefetch control circuit 42 may set the ReqP+2 bit in that entry to initiate more aggressive prefetching from that entry (block 176).

It is noted that the blocks of the flowchart in FIG. 9 may be representative of combinatorial logic circuitry in prefetch control circuit 42 and thus, while the blocks are illustrated in a particular order for ease of understanding, the blocks may be performed in parallel by such circuitry.

It is noted that, while the MAB tag is used for collision detection in the present embodiment, other embodiments may use any suitable tag, or may use the addresses themselves for collision detection.

Figure 10:
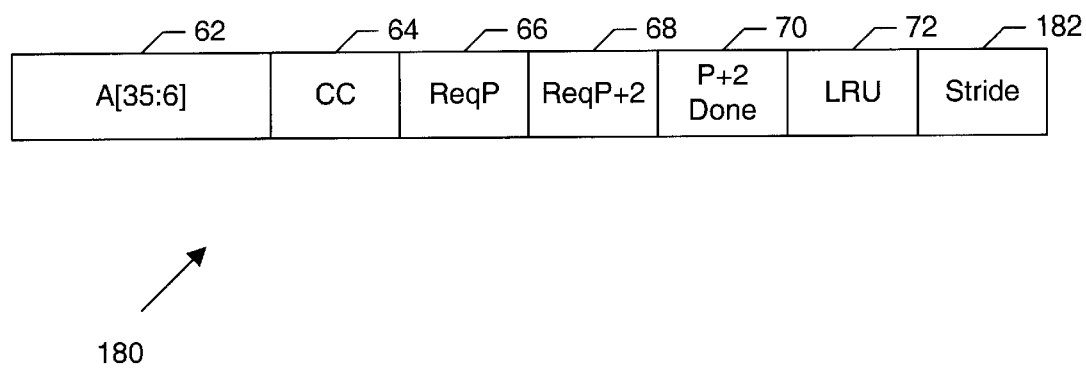
FIG. 10 is a block diagram of a third embodiment of an entry in the stride detect table.
Figure 11:
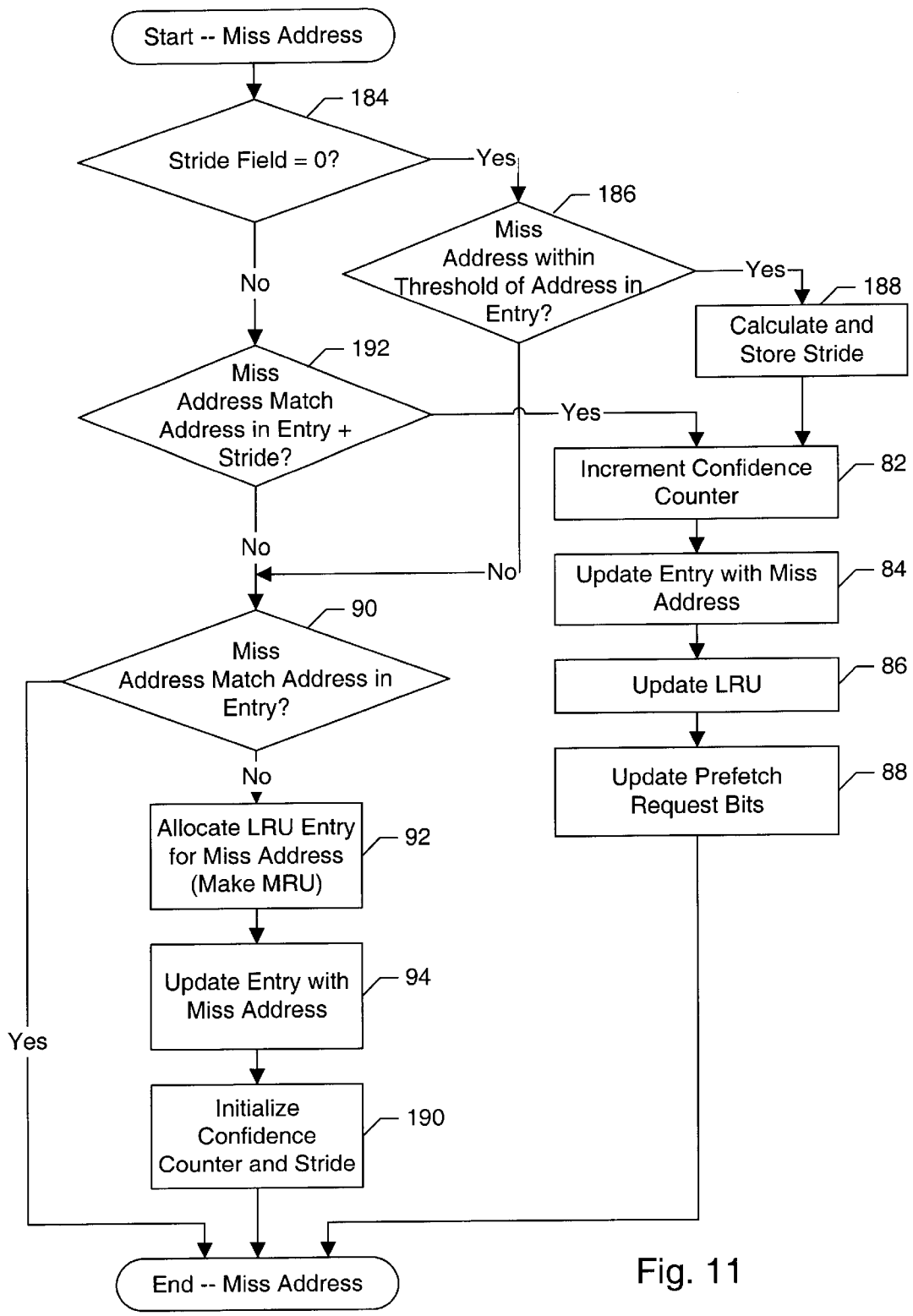
FIG. 11 is a flowchart illustrating operation of one embodiment of the prefetch control circuit for a general stride calculation.

Turning next to FIGS. 10–11, an alternative embodiment which supports variable stride lengths is shown. FIG. 11 is a flowchart illustrating operation of an embodiment of prefetch control circuit 42 in response to a miss address for the alternative embodiment. Generally, the flowcharts of FIGS. 5 and 6 may apply to this alternative embodiment as well, where the +1 address is the address plus the stride amount stored in the given entry and the +2 address is the address plus twice the stride amount stored in the given entry.

FIG. 10 is a block diagram of a third embodiment of an entry 180 which may be implemented in a third embodiment of stride detect table 44. Other embodiments are possible and contemplated. In the embodiment of FIG. 10, entry 180 includes fields 62, 64, 66, 68, 70, and 72 similar to entry 60 shown in FIG. 3. Additionally, entry 180 includes a stride field 182. The stride calculated for the pattern may be stored in stride field 182. Thus, each pattern may have its own, unique stride.

Turning next to FIG. 11, a flowchart is shown illustrating operation of one embodiment of prefetch control circuit 42 in response to a miss address. Other embodiments are possible and contemplated. The blocks of the flowchart in FIG. 11 may be representative of combinatorial logic circuitry in prefetch control circuit 42 and thus, while the blocks are illustrated in a particular order for ease of understanding, the blocks may be performed in parallel by such circuitry.

Since the stride is variable in the embodiment of FIGS. 10 and 11, the stride is calculated when the pattern is initially allocated to an entry. The first two addresses in the pattern are used to determine the stride. Accordingly, the stride field may be initialized to zero when the first address of a potential pattern is allocated to an entry and may be calculated from the next miss address received. More particularly, the next miss address which is within a threshold of the first miss address may be used to calculate the stride (to avoid attempting to track an unlikely pattern, which may be the case if the stride is too large). For example, a threshold of 4 cache lines may be used, or any other threshold such as 8 cache lines, 16 cache lines, etc.

Accordingly, if the stride field in an entry is zero (decision block 184), prefetch control circuit 42 may determine if the miss address is within a threshold of the address in the entry (decision block 186). If the miss address is within the threshold, prefetch control circuit 42 may calculate the stride (as the difference between the miss address and the address in the entry) and may store the stride in the stride field 182 of the entry (block 188). Additionally, prefetch control circuit 42 may increment the confidence counter, update the entry with the miss address, update the LRU for stride detect table 44, and update the prefetch request bits (blocks 82, 84, 86, and 88 similar to FIG. 4). If the miss address is not within a threshold, prefetch control circuit 42 may determine if the miss address matches the address in the entry (decision block 90, similar to FIG. 4). If the miss address matches the address in the entry, no action is taken. If the miss address does not match the address in any entry, then prefetch control circuit 42 may allocate the miss address to the LRU entry in stride detect table 44 and may update the entry with the miss address (blocks 92 and 94, similar to FIG. 4). Additionally, prefetch control circuit 42 may initialize the confidence counter to zero (similar to block 96 in FIG. 4) and may initialize the stride field to zero (block 190).

On the other hand, if the stride field is not zero, prefetch control circuit 42 may determine if the miss address matches the address in the entry plus the stride in the entry (decision block 192). If the address does match, then the next address in the pattern is detected and prefetch control circuit 42 may increment the confidence counter, update the entry with the miss address, update the LRU for stride detect table 44, and update the prefetch request bits (blocks 82, 84, 86, and 88 similar to FIG. 4). If the miss address does not match the address in the entry plus the stride in the entry, prefetch control circuit 42 may proceed as described above (decision block 90).

It is noted that embodiments including collision detection as illustrated in FIGS. 8 and 9 combined with the variable stride detection of FIGS. 10 and 11 are contemplated as well.

As used herein, a "table" is any type of memory, divided into one or more equal sized entries. The table may have a "top", which is the first entry allocated when the table is empty, and other entries may be ordered from the top to the bottom, which may be the last entry allocated as the table fills.

As used herein, the term "prefetch" refers to generating a memory request speculatively, based on memory requests generated directly in response to the code sequence being executed. The prefetch request is not directly in response to the code sequence being executed, but may be indirectly generated by processor 10 in response to directly generated memory requests. A memory request is directly generated if the definition of the instruction includes generation of the memory request.

As used herein, the term "threshold" refers to a value above which an event occurs and below which the event does not occur. For example, the first threshold described above may be a value of the confidence counter above which prefetching is initiated. The second threshold may be a value of the confidence counter above which the more aggressive prefetching is initiated.

Computer Systems

Figure 12:
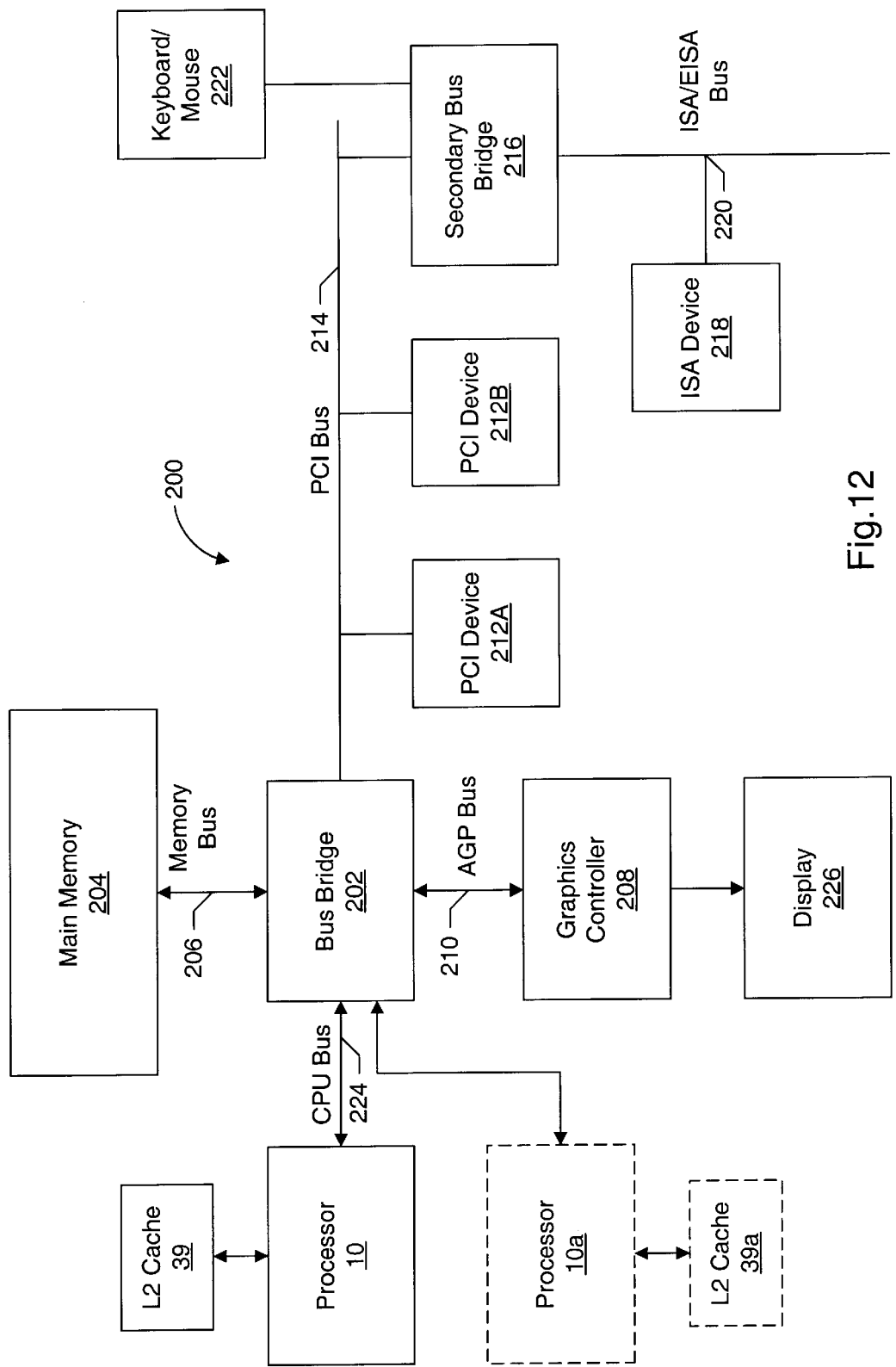
FIG. 12 is a block diagram of one embodiment of a computer system including the processor shown in FIG. 1.

Turning now to FIG. 12, a block diagram of one embodiment of a computer system 200 including processor 10 coupled to a variety of system components through a bus bridge 202 is shown. Other embodiments are possible and contemplated. In the depicted system, a main memory 204 is coupled to bus bridge 202 through a memory bus 206, and a graphics controller 208 is coupled to bus bridge 202 through an AGP bus 210. Finally, a plurality of PCI devices 212A–212B are coupled to bus bridge 202 through a PCI bus 214. A secondary bus bridge 216 may further be provided to accommodate an electrical interface to one or more EISA or ISA devices 218 through an EISA/ISA bus 220. Processor 10 is coupled to bus bridge 202 through a CPU bus 224 and to an optional L2 cache 39. Together, CPU bus 224 and the interface to L2 cache 39 may comprise an external interface to which bus interface unit 37 may couple.

Bus bridge 202 provides an interface between processor 10, main memory 204, graphics controller 208, and devices attached to PCI bus 214. When an operation is received from one of the devices connected to bus bridge 202, bus bridge 202 identifies the target of the operation (e.g. a particular device or, in the case of PCI bus 214, that the target is on PCI bus 214). Bus bridge 202 routes the operation to the targeted device. Bus bridge 202 generally translates an operation from the protocol used by the source device or bus to the protocol used by the target device or bus.

In addition to providing an interface to an ISA/EISA bus for PCI bus 214, secondary bus bridge 216 may further incorporate additional functionality, as desired. An input/output controller (not shown), either external from or integrated with secondary bus bridge 216, may also be included within computer system 200 to provide operational support for a keyboard and mouse 222 and for various serial and parallel ports, as desired. An external cache unit (not shown) may further be coupled to CPU bus 224 between processor 10 and bus bridge 202 in other embodiments. Alternatively, the external cache may be coupled to bus bridge 202 and cache control logic for the external cache may be integrated into bus bridge 202. L2 cache 39 is further shown in a backside configuration to processor 10. It is noted that L2 cache 39 may be separate from processor 10, integrated into a cartridge (e.g. slot 1 or slot A) with processor 10, or even integrated onto a semiconductor substrate with processor 10.

Main memory 204 is a memory in which application programs are stored and from which processor 10 primarily executes. A suitable main memory 204 comprises DRAM (Dynamic Random Access Memory). For example, a plurality of banks of SDRAM (Synchronous DRAM) or Rambus DRAM (RDRAM) may be suitable.

PCI devices 212A–212B are illustrative of a variety of peripheral devices. The peripheral devices may include devices for communicating with another computer system to which the devices may be coupled (e.g. network interface cards, modems, etc.). Additionally, peripheral devices may include other devices, such as, for example, video accelerators, audio cards, hard or floppy disk drives or drive controllers, SCSI (Small Computer Systems Interface) adapters and telephony cards. Similarly, ISA device 218 is illustrative of various types of peripheral devices, such as a modem, a sound card, and a variety of data acquisition cards such as GPIB or field bus interface cards.

Graphics controller 208 is provided to control the rendering of text and images on a display 226. Graphics controller 208 may embody a typical graphics accelerator generally known in the art to render three-dimensional data structures which can be effectively shifted into and from main memory 204. Graphics controller 208 may therefore be a master of AGP bus 210 in that it can request and receive access to a target interface within bus bridge 202 to thereby obtain access to main memory 204. A dedicated graphics bus accommodates rapid retrieval of data from main memory 204. For certain operations, graphics controller 208 may further be configured to generate PCI protocol transactions on AGP bus 210. The AGP interface of bus bridge 202 may thus include functionality to support both AGP protocol transactions as well as PCI protocol target and initiator transactions. Display 226 is any electronic display upon which an image or text can be presented. A suitable display 226 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 200 may be a multiprocessing computer system including additional processors (e.g. processor 10a shown as an optional component of computer system 200). Processor 10a may be similar to processor 10. More particularly, processor 10a may be an identical copy of processor 10. Processor 10a may be connected to bus bridge 202 via an independent bus (as shown in FIG. 12) or may share CPU bus 224 with processor 10. Furthermore, processor 10a may be coupled to an optional L2 cache 39a similar to L2 cache 39.

Figure 13:
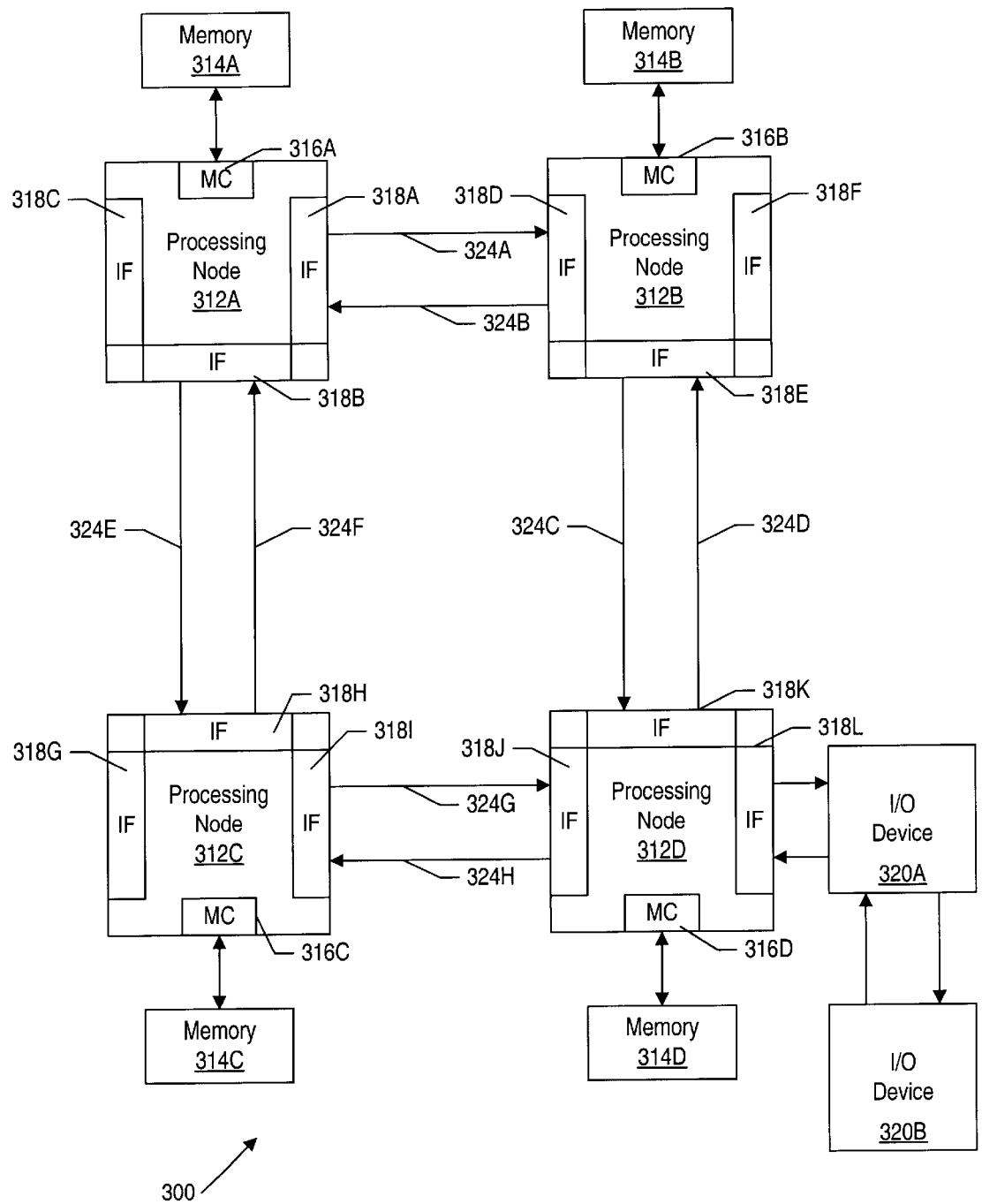
FIG. 13 is a block diagram of a second embodiment of a computer system including the processor shown in FIG. 1.

Turning now to FIG. 13, another embodiment of a computer system 300 is shown. Other embodiments are possible and contemplated. In the embodiment of FIG. 13, computer system 300 includes several processing nodes 312A, 312B, 312C, and 312D. Each processing node is coupled to a respective memory 314A–314D via a memory controller 316 A–316D included within each respective processing node 312A–312D. Additionally, processing nodes 312A–312D include interface logic used to communicate between the processing nodes 312A–312D. For example, processing node 312A includes interface logic 318A for communicating with processing node 312B, interface logic 318B for communicating with processing node 312C, and a third interface logic 318C for communicating with yet another processing node (not shown). Similarly, processing node 312B includes interface logic 318D, 318E, and 318F; processing node 312C includes interface logic 318G, 318H, and 318I; and processing node 312D includes interface logic 318J, 318K, and 318L. Processing node 312D is coupled to communicate with a plurality of input/output devices (e.g. devices 320A–320B in a daisy chain configuration) via interface logic 318L. Other processing nodes may communicate with other I/O devices in a similar fashion.

Processing nodes 312A–312D implement a packet-based link for inter-processing node communication. In the present embodiment, the link is implemented as sets of unidirectional lines (e.g. lines 324A are used to transmit packets from processing node 312A to processing node 312B and lines 324B are used to transmit packets from processing node 312B to processing node 312A). Other sets of lines 324C–324H are used to transmit packets between other processing nodes as illustrated in FIG. 13. Generally, each set of lines 324 may include one or more data lines, one or more clock lines corresponding to the data lines, and one or more control lines indicating the type of packet being conveyed. The link may be operated in a cache coherent fashion for communication between processing nodes or in a noncoherent fashion for communication between a processing node and an I/O device (or a bus bridge to an I/O bus of conventional construction such as the PCI bus or ISA bus). Furthermore, the link may be operated in a noncoherent fashion using a daisy-chain structure between I/O devices as shown. It is noted that a packet to be transmitted from one processing node to another may pass through one or more intermediate nodes. For example, a packet transmitted by processing node 312A to processing node 312D may pass through either processing node 312B or processing node 312C as shown in FIG. 13. Any suitable routing algorithm may be used. Other embodiments of computer system 300 may include more or fewer processing nodes then the embodiment shown in FIG. 13.

Generally, the packets may be transmitted as one or more bit times on the lines 324 between nodes. A bit time may be the rising or falling edge of the clock signal on the corresponding clock lines. The packets may include command packets for initiating transactions, probe packets for maintaining cache coherency, and response packets from responding to probes and commands.

Processing nodes 312A–312D, in addition to a memory controller and interface logic, may include one or more processors. Broadly speaking, a processing node comprises at least one processor and may optionally include a memory controller for communicating with a memory and other logic as desired. More particularly, each processing node 312A–312D may comprise one or more copies of processor 10. Bus interface unit 37 may include the interface logic 318 within the node, as well as the memory controller 316.

Memories 314A–314D may comprise any suitable memory devices. For example, a memory 314A–314D may comprise one or more RAMBUS DRAMs (RDRAMs), synchronous DRAMs (SDRAMs), static RAM, etc. The address space of computer system 300 is divided among memories 314A–314D. Each processing node 312A–312D may include a memory map used to determine which addresses are mapped to which memories 314A–314D, and hence to which processing node 312A–312D a memory request for a particular address should be routed. In one embodiment, the coherency point for an address within computer system 300 is the memory controller 316A–316D coupled to the memory storing bytes corresponding to the address. In other words, the memory controller 316A–316D is responsible for ensuring that each memory access to the corresponding memory 314A–314D occurs in a cache coherent fashion. Memory controllers 316A–316D may comprise control circuitry for interfacing to memories 314A–314D. Additionally, memory controllers 316A–316D may include request queues for queuing memory requests.

Generally, interface logic 318A–318L may comprise a variety of buffers for receiving packets from the link and for buffering packets to be transmitted upon the link. Computer system 300 may employ any suitable flow control mechanism for transmitting packets. For example, in one embodiment, each interface logic 318 stores a count of the number of each type of buffer within the receiver at the other end of the link to which that interface logic is connected. The interface logic does not transmit a packet unless the receiving interface logic has a free buffer to store the packet. As a receiving buffer is freed by routing a packet onward, the receiving interface logic transmits a message to the sending interface logic to indicate that the buffer has been freed. Such a mechanism may be referred to as a "coupon-based" system.

I/O devices 320A–320B may be any suitable I/O devices. For example, I/O devices 320A–320B may include devices for communicate with another computer system to which the devices may be coupled (e.g. network interface cards or modems). Furthermore, I/O devices 320A–320B may include video accelerators, audio cards, hard or floppy disk drives or drive controllers, SCSI (Small Computer Systems Interface) adapters and telephony cards, sound cards, and a variety of data acquisition cards such as GPIB or field bus interface cards. It is noted that the term "I/O device" and the term "peripheral device" are intended to be synonymous herein.

Numerous variations and modifications will become apparent to those skilled in the art once the above disclosure is fully appreciated. It is intended that the following claims be interpreted to embrace all such variations and modifications.

What is claimed is:

1. A processor comprising:
    a table having at least a first entry configured to store at least a portion of a first address and a corresponding first count; and
    a control circuit coupled to the table, wherein the control circuit is configured to select a second address equal to a sum of the first address and a first value as a prefetch address responsive to the first count being greater than or equal to a first threshold, and wherein the control circuit is configured to select a third address equal to a sum of the first address and a second value as the prefetch address responsive to the first count being greater than or equal to a second threshold, and wherein the second value is greater than the first value, and wherein the second threshold is greater than the first threshold.

2. The processor as recited in claim 1 wherein the second value is twice the first value.

3. The processor as recited in claim 2 wherein the first value is a size of one cache line.

4. The processor as recited in claim 2 wherein the first value is stored in the first entry, and wherein the first value is equal to a difference between the first address and a fourth address previously stored in the first entry.

5. The processor as recited in claim 4 wherein the control circuit is configured to initialize the first value to zero in response to allocating the first entry to a fifth address.

6. The processor as recited in claim 5 wherein the control circuit is configured to calculate the first value as a difference between a sixth address and the fifth address if the sixth address is within a third threshold of the fifth address.

7. The processor as recited in claim 1 wherein the table is coupled to receive at least a fourth address, and wherein the control circuit is configured to increment the first count if the fourth address matches the sum of the first address and the first value.

8. The processor as recited in claim 7 wherein the control circuit is further configured to update the first entry with at least a portion of the fourth address, whereby the second address becomes the sum of the fourth address and the first value and the third address becomes the sum of the fourth address and the second value.

9. The processor as recited in claim 8 wherein the control circuit is coupled to receive a signal from a data cache indicative of whether or not the fourth address is a hit or a miss in the data cache, and wherein the control circuit is configured to increment the first count and update the first entry with the fourth address only if the fourth address is a miss in the data cache.

10. The processor as recited in claim 9 wherein the data cache is a first level data cache in the processor.

11. The processor as recited in claim 10 further comprising a second level cache, wherein data fetched in response to the prefetch address is stored in the second level cache.

12. The processor as recited in claim 8 wherein the control circuit is configured to select the prefetch address in response to the fourth address matching the sum of the first address and the first value.

13. The processor as recited in claim 12 wherein the control circuit is configured to select the second address and subsequent select the third address, both in response to the fourth address matching the sum of the first address and the first value, further in response to the first count being greater than or equal to the second threshold for the first time.

14. The processor as recited in claim 13 wherein the control circuit is configured to select the third address as the prefetch address thereafter, in response to receiving additional addresses into the first entry.

15. The processor as recited in claim 12 wherein the control circuit is configured to arbitrate for a miss buffer entry in a bus interface unit for the prefetch address, and wherein the control circuit is configured to stop arbitrating in response to winning the miss buffer entry.

16. The processor as recited in claim 15 further comprising a first incrementor and a second incrementor coupled to the table and a multiplexor coupled to the first incrementor, the second incrementor, and the control circuit, wherein the first incrementor is configured to add the first value to an address from the table to generate the second address, and wherein the second incrementor is configured to add the second value to the address from the table to generate the third address, and wherein the multiplexor is configured to select between the second address and the third address to provide the prefetch address in response to a control signal from the control circuit.

17. The processor as recited in claim 16 wherein, if the control circuit does not win the miss buffer entry for prefetching the third address and a fifth address matching the sum of the fourth address and the first value is received, the control circuit is configured to update the first entry to at least a portion of the fifth address and to select the second address as the prefetch address.

18. The processor as recited in claim 1 wherein the table comprises a plurality of entries including the first entry, and wherein, if more than one of the plurality of entries is ready for prefetching, the control circuit is configured to select one of the plurality of entries.

19. The processor as recited in claim 18 wherein the one of the plurality of entries is the entry nearest the top of the table.

20. The processor as recited in claim 18 wherein the one of the plurality of entries is the most recently used one of the plurality of entries.

21. A method comprising:
    storing at least a portion of a first address and a corresponding first count;
    selecting a second address equal to a sum of the first address and a first value as a prefetch address responsive to the first count being greater than or equal to a first threshold; and selecting a third address equal to a sum of the first address and a second value as the prefetch address responsive to the first count being greater than or equal to a second threshold;

wherein the second value is greater than the first value, and wherein the second threshold is greater than the first threshold.

22. The method as recited in claim 21 wherein the second value is twice the first value.

23. The method as recited in claim 22 wherein the first value is a size of one cache line.

24. The method as recited in claim 22 wherein the storing includes storing the first value, and wherein the method further comprises calculating the first value as a difference between the first address and a previously stored fourth address.

25. The method as recited in claim 21 further comprising:

receiving a fourth address; and incrementing the first count if the fourth address matches the sum of the first address and the first value.

26. The method as recited in claim 25 further comprising storing at least a portion of the fourth address, whereby the second address becomes the sum of the fourth address and the first value and the third address becomes the sum of the fourth address and the second value.

27. The method as recited in claim 26 further comprising receiving a signal from a data cache indicative of whether or not the fourth address is a hit or a miss in the data cache, wherein the incrementing the first count and the storing the fourth address are responsive to the signal indicating that the forth address is a miss in the data cache.

28. The method as recited in claim 27 wherein the data cache is a first level data cache, the method further comprising prefetching data corresponding to the prefetch address into a second level cache.

29. The method as recited in claim 26 wherein the selecting the second address and the selecting the third address are responsive to the fourth address matching the sum of the first address and the first value.

30. The method as recited in claim 29 further comprising selecting the second address and subsequently selecting the third address, both in response to the fourth address matching the sum of the first address and the first value, and further in response to the first count being greater than or equal to the second threshold for the first time.

31. The method as recited in claim 30 further comprising selecting the third address as the prefetch address thereafter, in response to receiving additional addresses.

* * * * *